(12) United States Patent
Sawahashi et al.

(10) Patent No.: US 10,177,887 B2
(45) Date of Patent: Jan. 8, 2019

(54) RADIO BASE STATION, USER TERMINAL AND RADIO COMMUNICATION METHOD

(71) Applicant: NTT DOCOMO, INC., Tokyo (JP)

(72) Inventors: Mamoru Sawahashi, Tokyo (JP); Teruo Kawamura, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 17 days.

(21) Appl. No.: 15/121,935

(22) PCT Filed: Feb. 27, 2015

(86) PCT No.: PCT/JP2015/055905
§ 371 (c)(1),
(2) Date: Aug. 26, 2016

(87) PCT Pub. No.: WO2015/129873
PCT Pub. Date: Sep. 3, 2015

(65) Prior Publication Data
US 2017/0078061 A1    Mar. 16, 2017

(30) Foreign Application Priority Data
Feb. 28, 2014   (JP) .................. 2014-039562

(51) Int. Cl.
*H04L 25/02* (2006.01)
*H04L 5/00* (2006.01)
(Continued)

(52) U.S. Cl.
CPC .......... *H04L 5/0048* (2013.01); *H04L 5/0044* (2013.01); *H04L 25/03821* (2013.01);
(Continued)

(58) Field of Classification Search
CPC . H04L 5/02; H04L 5/023; H04L 5/022; H04L 25/0202; H04L 25/0224; H04B 1/7097
See application file for complete search history.

(56) References Cited

U.S. PATENT DOCUMENTS

2007/0093262 A1    4/2007   Li et al.
2013/0107694 A1*   5/2013   Hu .................. H04J 13/0003
                                                      370/203
(Continued)

FOREIGN PATENT DOCUMENTS

JP    2009515385 A    4/2009
JP    2013009288 A    1/2013

OTHER PUBLICATIONS

Extended European Search Report issued in corresponding European Patent Application No. 15754699.5, dated Aug. 1, 2017 (9 pages).
(Continued)

*Primary Examiner* — Andrew W Chriss
*Assistant Examiner* — Kenan Cehic
(74) *Attorney, Agent, or Firm* — Osha Liang LLP

(57) ABSTRACT

A radio base station that communicates with a user terminal, and has a control section that executes control so that signals are time-division-multiplexed over a first radio resource region where symbols are multiplexed at a rate equal to or below a Nyquist rate and a second radio resource region where symbols are multiplexed at a faster rate than the Nyquist rate. The radio base station also includes a transmission section that transmits the signals that are time-division-multiplexed in the first radio resource region and the second radio resource region, to the user terminal, to reduce the interference against predetermined signals in a radio communication system in which Faster-Than-Nyquist (FTN) is used.

10 Claims, 20 Drawing Sheets

(51) Int. Cl.
  *H04L 25/03* (2006.01)
  *H04L 25/06* (2006.01)
  *H04L 27/26* (2006.01)
  *H04W 84/04* (2009.01)
  *H04B 1/7107* (2011.01)

(52) U.S. Cl.
  CPC ........ *H04L 25/068* (2013.01); *H04L 27/2698* (2013.01); *H04B 1/71072* (2013.01); *H04L 25/023* (2013.01); *H04L 25/0204* (2013.01); *H04W 84/042* (2013.01)

(56) References Cited

U.S. PATENT DOCUMENTS

| | | | | |
|---|---|---|---|---|
| 2014/0064238 A1* | 3/2014 | Zancho | ............... | H04L 25/0212 370/330 |
| 2014/0086372 A1 | 3/2014 | Kishiyama et al. | | |
| 2014/0119334 A1* | 5/2014 | Kazmi | .................. | H04W 24/10 370/330 |
| 2016/0191218 A1* | 6/2016 | Bala | ...................... | H04L 5/0007 370/203 |

OTHER PUBLICATIONS

International Search Report issued in corresponding application No. PCT/JP2015/055905 dated Apr. 7, 2015 (4 pages).
Written Opinion of the International Searching Authority issued in corresponding application No. PCT/JP2015/055905 dated Apr. 7, 2015 (4 pages).
3GPP TS 36.300 V12.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Deepak Dasalukunte et al., "Multicarrier Faster-Than-Nyquist Transceivers: Hardware Architecture and Performance Analysis"; IEEE Transactions on Circuits and Systems I: Regular Papers, vol. 58, No. 4, pp. 827-838; Apr. 2011 (12 pages).
T. Hirano et al., "TDM Based Reference Signal Multiplexing for Faster-than-Nyquist Signaling Using OFDM/OQAM"; Proceedings of the 2014 IEEE ICCS, pp. 437-441; Nov. 19, 2014 (5 pages).
T. Hirano et al., "TDM Based Reference Signal Multiplexing for Faster-than-Nyquist Signaling Using OFDM/OQAM"; IEICE Technical Report, vol. 114, No. 180, pp. 85-90; RCS2014-153; Aug. 12, 2014 (6 pages).
Office Action issued in corresponding Japanese Application No. 2014-039562, dated Aug. 22, 2017 (9 pages).

* cited by examiner

| | METHOD TO USE INVERSE FAST FRACTIONAL FT (IFFrFT) | METHOD TO USE PLURALITY OF IFFTS | METHOD TO PERFORM MAPPING CONVERSION OF FTN SYMBOL INTO OFDM/OQAM SYMBOL |
|---|---|---|---|
| GENERATION METHOD | DIRECTLY GENERATE FTN SYMBOLS THAT ARE SUBJECT TO INTER-SYMBOL INTERFERENCE | GENERATE BY ADDING TIME DOMAIN SIGNAL HAVING BEEN SUBJECTED TO IFFT, TO OFDM/OQAM (OFDM) SYMBOL | PROJECT FTN SYMBOL ON OFDM/OQAM SYMBOL AND APPLY IFFT |
| VOLUME OF CALCULATION | MEDIUM | LARGE | MEDIUM |
| FLEXIBILITY OF IMPLEMENTATION VERSUS CHANGE OF EFFICIENCY OF FTN MULTIPLEXING | KERNEL FUNCTION IN IFFrFT NEEDS TO BE CHANGED | NUMBER OF IFFTS NEEDS TO BE CHANGED | PROJECTION COEFFICIENT TABLE NEEDS TO BE CHANGED |
| FLEXIBILITY OF SWITCHING WITH ORTHOGONAL OFDM | NOT FLEXIBLE | NOT FLEXIBLE | FLEXIBLE SWITCHING IS POSSIBLE |

FIG.3

$\tau_0$: OFDM/OQAM SYMBOL DURATION

US 10,177,887 B2

RADIO BASE STATION, USER TERMINAL AND RADIO COMMUNICATION METHOD

TECHNICAL FIELD

The present invention relates to a radio base station, a user terminal, a radio communication method and a radio communication system in a next-generation mobile communication system.

BACKGROUND ART

In the UMTS (Universal Mobile Telecommunication system) network, the specifications of long term evolution (LTE) have been drafted for the purpose of further increasing high speed data rates, providing lower delays and so on (see non-patent literature 1). In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

In LTE systems, techniques for achieving further improvement of cell throughput are under study. For example, spatial multiplexing (SDM: Spatial Division Multiplexing) based on MIMO (Multiple Input Multiple Output), inter-base station coordinated (CoMP: Coordinated Multi-Point) transmission/reception and so on are under study.

CITATION LIST

Non-Patent Literature

Non-Patent Literature 1: 3GPP TS 36. 300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

As a method for improving cell throughput, non-orthogonal multiple access to allow interference between information symbols and multiplex radio resources in a high density is under study. As for the method of implementing non-orthogonal multiple access, FTN (Faster-Than-Nyquist), which is a scheme to multiplex symbols at a faster rate than the Nyquist rate, is proposed.

However, when FTN is employed, there is a threat that the symbols of predetermined subcarrier locations cause significant inter-subcarrier (carrier-wave) interference (ICI: Inter-Carrier Interference) against other symbols.

Consequently, when FTN is employed, there is a threat that cell throughput deteriorates when the reference signals to use in channel estimation suffer significant ICI from other symbols. For example, when FTN is employed, ICI has increased impact on cell-specific reference signals (CRSs) that are placed over resource blocks. On the other hand, if the allocation of radio resources is adjusted so that ICI has no impact on reference signals, the information symbols to which FTN can be applied are very limited, meaning that the effect of improving spectral efficiency by FTN cannot be achieved.

The present invention has been made in view of the above, and it is therefore an object of the present invention to provide a radio base station, a user terminal, a radio communication method and a radio communication system that can reduce interference against predetermined signals in a radio communication system which FTN is used.

Solution to Problem

The radio base station according to one aspect of the present invention is a radio base station a control section that executes control so that signals are time-division-multiplexed over a first radio resource region where symbols are multiplexed at a rate equal to or below a Nyquist rate and a second radio resource region where symbols are multiplexed at a faster rate than the Nyquist rate, and a transmission section that transmits the signals that are time-division-multiplexed in the first radio resource region and the second radio resource region, to a user terminal.

Advantageous Effects of Invention

According to the present invention, it is possible to reduce the interference against predetermined signals in a radio communication system in which FTN is employed.

BRIEF DESCRIPTION OF DRAWINGS

FIG. 3 is a diagram to explain characteristics of FTN signal generation methods;

DESCRIPTION OF EMBODIMENTS

Figure 1A:
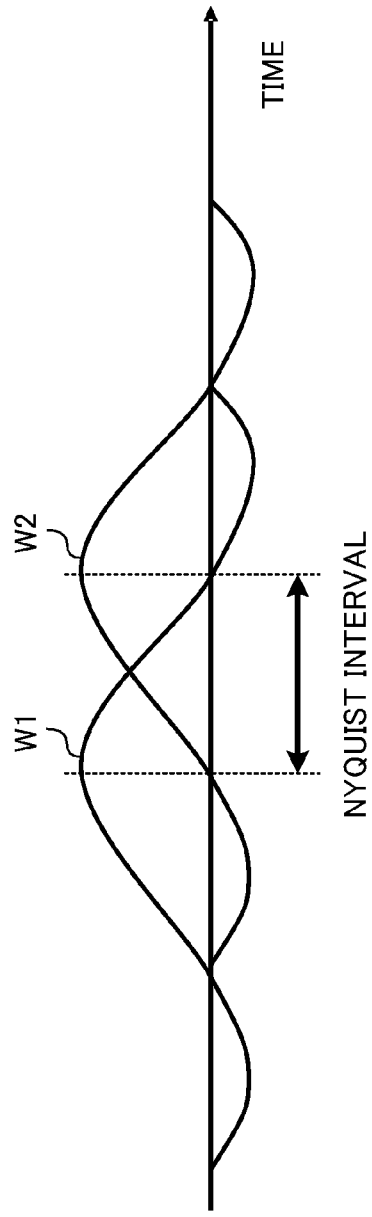
FIG. 1 provide diagrams to explain signal communication at or below a Nyquist rate and signal communication in FTN.

Now, an embodiment of the present invention will be described below in detail with reference to the accompanying drawings.

In radio communication systems, there is a demand for further increase of cell throughput (the total throughput of all user terminals in a cell). The maximum throughput per user terminal depends primarily on the scheduling method (range) which the radio base station applies to each user terminal. In LTE systems, various throughput-improving techniques are under study.

MIMO (Multiple Input Multiple Output)-based spatial multiplexing (SDM: Spatial Division Multiplexing) is one of the most promising techniques to improve throughput and spectral efficiency in LTE systems. MIMO SDM refers to a scheme of spatially multiplexing and communicating signals (streams) by using a plurality of transmitting/receiving antennas. For example, LTE (Rel. 8 LTE) can achieve a peak data rate of 300 Mbps or higher by means of MIMO SDM with maximum four antennas. Also, in LTE-A (Rel. 10 LTE), a peak data rate of 1 Gbps or higher can be achieved by means of single-user/multi-user MIMO SDM with maximum eight antennas.

Also, in LTE systems, inter-base station coordinated (CoMP: Coordinated Multi-Point) transmission/reception is also under study. In CoMP transmission/reception, a plurality of transmitting/receiving points coordinate and transmit/receive signals to/from user terminals. That is, by using radio resources (time, frequency and power resources and/or the like) of multiple nodes (cell sites), it becomes possible to improve the throughput of, in particular, cell-edge user terminals. Still, since a plurality of cells' radio resources are used for one user terminal, it is necessary to consider the tradeoff with cell throughput, and, furthermore, fast scheduling between cells is important.

To achieve an increased peak data rate, it is effective to multiplex physical channels densely. As to how to provide physical channels in a high density, the spatial direction, the frequency direction, the time direction and so on may be possible.

To provide radio resources densely in the spatial direction, the antenna space or the signal space has to be expanded. The antenna space can be expanded by increasing the number of antennas in above-described MIMO multiplexing. For example, although MIMO SDM with maximum eight antennas is employed in LTE-A, it is possible to increase the number of antennas even more (for example, to 24 to 36). Also, it may be equally possible to introduce polarized antennas for the antennas, and apply vertically polarized waves and horizontally polarized waves to the signals to transmit and receive.

On the other hand, the signal space can be expanded by increasing the M-ary modulation value. For example, although LTE-A supports 64QAM at a maximum, the signal space can be expanded even more by increasing the M-ary modulation value (for example, 256QAM, 512QAM, etc.).

To provide radio resources densely in the frequency direction, it may be possible to use a non-orthogonal multiple access (NOMA) scheme. In NOMA, signals for a plurality of user terminals UE are non-orthogonal-multiplexed over the same radio resource by changing transmission power depending on channel gain (for example, the RSRP (Reference Signal Received Power)), path loss and so on. Consequently, unlike orthogonal multiplexing schemes such as OFDMA, interference may be produced between subcarriers (carrier waves) (also referred to as "inter-carrier interference" (ICI)).

Note that, in the frequency direction, the data rate can be improved by increasing the radio resources. For example, a plurality of a frequency bands can be bundled and used by means of spectrum aggregation techniques such as carrier aggregation, dual connectivity and so on.

To provide radio resources densely in the time direction, it is possible to use non-orthogonal multiple access that is apart from the one described above. For example, the principle of FTN (Faster-Than-Nyquist) is applied as a non-orthogonal multiple access scheme. FTN refers to multiplexing symbols at a faster symbol rate than the Nyquist rate. The Nyquist rate refers to the uppermost symbol rate at which symbols that are communicated in a finite band (for example, the LTE system band) can be decoded uniquely. In this case, interference (also referred to as "inter-symbol interference" (ISI)) may be produced between information symbols.

Existing mobile communication schemes (orthogonal multiple access) are configured so that interference between information symbols (also referred to as "inter-symbol interference" (ISI)) and ICI are prevented by multiplexing information symbols over resources that are orthogonal in the time and frequency domains at a rate equal to or lower than the Nyquist rate. Meanwhile, since communication schemes to employ FTN become non-orthogonal multiple access schemes and the number of information symbols per time can be increased in comparison with orthogonal multiple access, these communication schemes still suffer the impact of ISI (interference in the time domain) and ICI (interference in the frequency domain). Note that the information symbols refer to symbols that are provided by modulating predetermined bit sequences, including data symbols, control information symbols and so on.

Figure 1B:
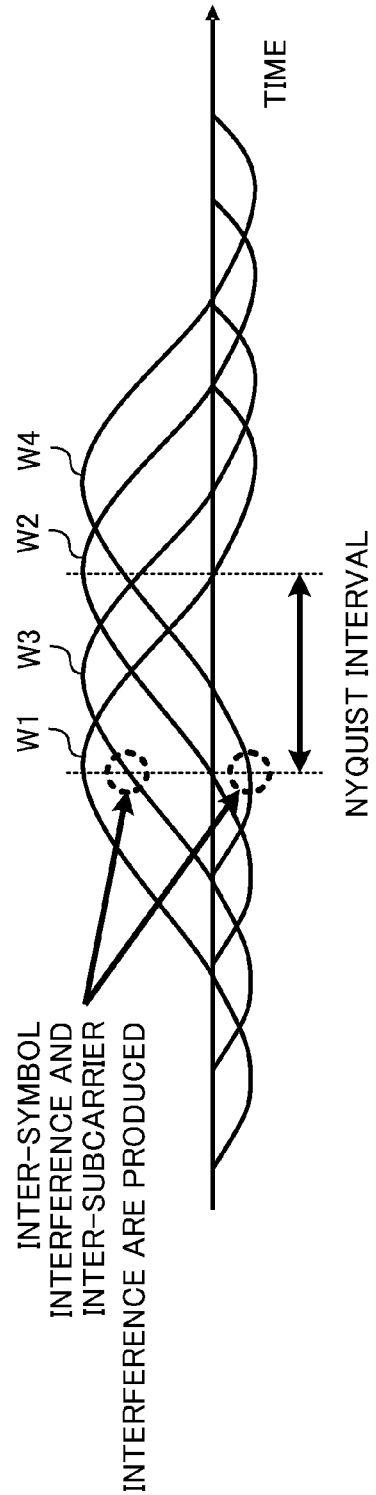

FIG. 1 provide diagrams to explain signal communication at or below the Nyquist rate, and signal communication in FTN. The waveforms W1 and W2 in FIG. 1A represent symbols that are multiplexed at a rate equal to or lower than the Nyquist rate (for example, multiplexed at the Nyquist interval). If each waveform is sampled at the point in time the highest intensity is exhibited, it is possible, in effect, to disregard the intensity of the other signal. On the other hand, the waveforms W1 to W4 of FIG. 1B represent symbols that are multiplexed in FTN (for example, multiplexed at ½ intervals of the Nyquist interval). In this case, in the sampling time of W1 (for example, the time the signal intensity is the highest), the symbols of W3 and W4 produce ISI and/or ICI.

Figure 2:
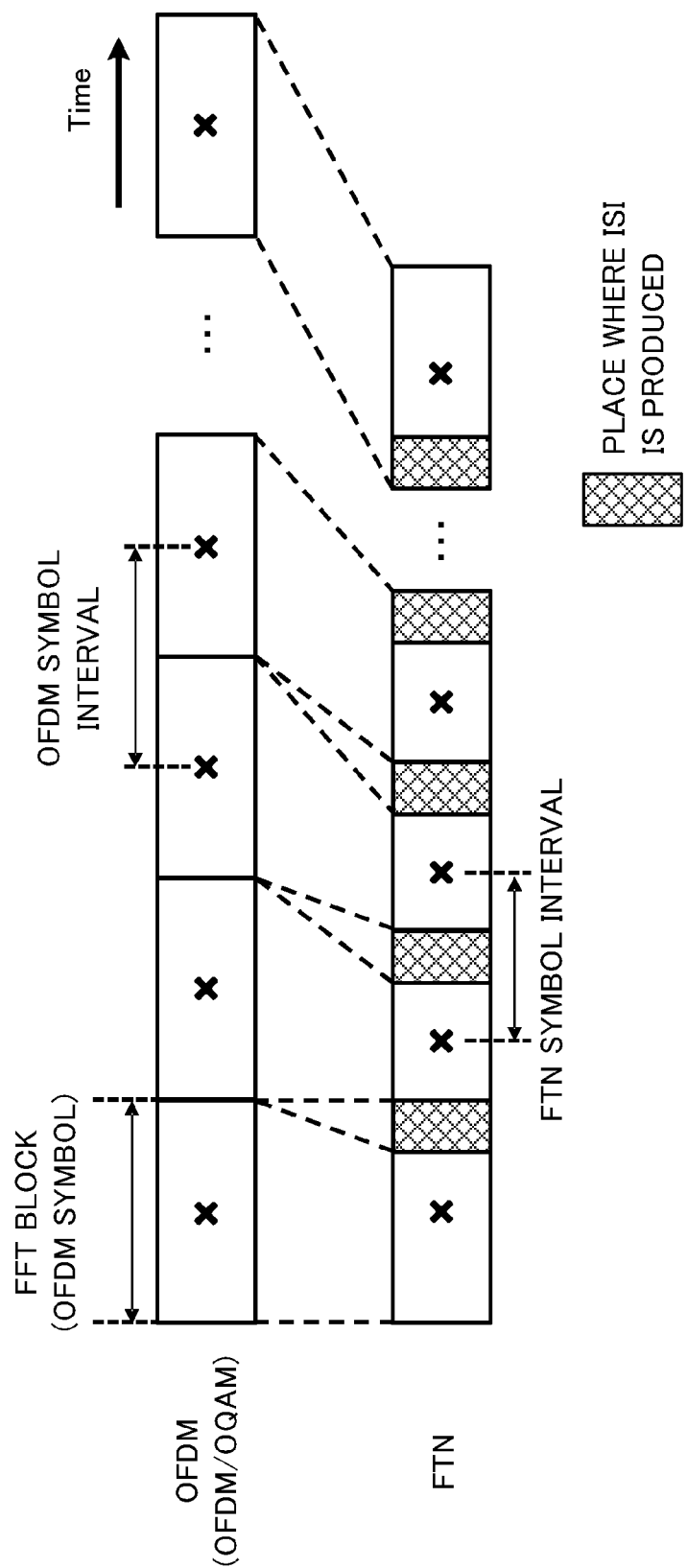
FIG. 2 is a conceptual diagram of OFDM symbols and FTN symbols.

This problem will be described using a more conceptual example. FIG. 2 is a conceptual diagram of OFDM symbols and FTN symbols. Here the FTN symbols are symbols multiplexed at a symbol rate faster than the Nyquist rate. Note that FIG. 2 shows a case where no cyclic prefix (CP) is assigned to each symbol.

In OFDM, the OFDM symbol duration is equal to the length of FFT blocks, and also equal to the OFDM symbol interval as well. Consequently, if "multipath" of communication paths is not taken into account, no ISI is produced. Also, basically, ICI is not produced either.

In the event of FTN, although the FTN symbol duration is equal to the length of FFT blocks, the FTN symbol interval is shorter than the OFDM symbol interval. Consequently, ISI is produced. Also, looking at a predetermined symbol period, since ISI is produced before and after, ICI is also produced due to the discontinuity of the carrier frequency.

In view of the above, an interference canceller to cancel ISI and ICI is essential to the FTN receiver for performing the receiving processes of FTN signals. For example, a turbo soft interference canceller (SIC), which performs the iterative process of generating estimated soft decision values of interfering symbols from a linear minimum mean-square error (LMMSE) interference reduction canceller, and the log-likelihood ratio (LLR) of each bit of decoder output, and subtract these from received signals, is suitable from the perspective of performance and the volume of calculation.

Meanwhile, as for the method of generating FTN signals, for example, the methods illustrated in FIG. 3 are under study. FIG. 3 is a diagram to explain the characteristics of FTN signal generation methods.

In FIG. 3, the method to use the inverse fast fractional Fourier transform (IFFrFT) is a method to directly generate FTN symbols that are subject to inter-symbol interference. This generation method can be implemented with one IFFrFT section, the IFFrFT calculation makes use of a kernel function, so that the volume of calculation is a little complex (medium). To change the efficiency of FTN multiplexing (how much each FTN symbol overlaps each other in time and is multiplexed), the kernel function needs to be changed. Also, since the IFFrFT is used instead of the inverse fast Fourier transform (IFFT), normal OFDM signals and FTN signals cannot be switched flexibly.

In FIG. 3, the method to use a plurality of IFFTs is a generation method to add time domain signals that have been subjected to an IFFT, to OFDM/OQAM (or OFDM) symbols. With this generation method, the number of IFFTs increases following an increase in the efficiency of FTN multiplexing, and symbol (subcarrier)-shifting pre-processing is required, so that the amount of calculation is comparatively large. To change the efficiency of FTN multiplexing, the number of IFFTs needs to be changed. Also, since a plurality of IFFTs are used, normal OFDM signals and FTN signals cannot be switched in a flexible manner. Note that normal OFDM signals (normal OFDM/OQAM signals) refer to signals in which symbols are multiplexed at a symbol rate equal to or lower than the Nyquist rate.

Here, OFDM/OQAM (Offset Quadrature Amplitude Modulation) refers to the method of multiplexing (mapping) the in-phase components and quadrature components of OFDM symbols of a symbol cycle (symbol interval) T on in-phase components alone, at intervals half of the OFDM symbol cycle (=T/2). Consequently, although OFDM/OQAM achieves a symbol rate that is twice that of OFDM, information of one OFDM symbol is communicated using two OFDM/OQAM symbols, so that the information bit rate is the same as that of OFDM.

Figure 4:
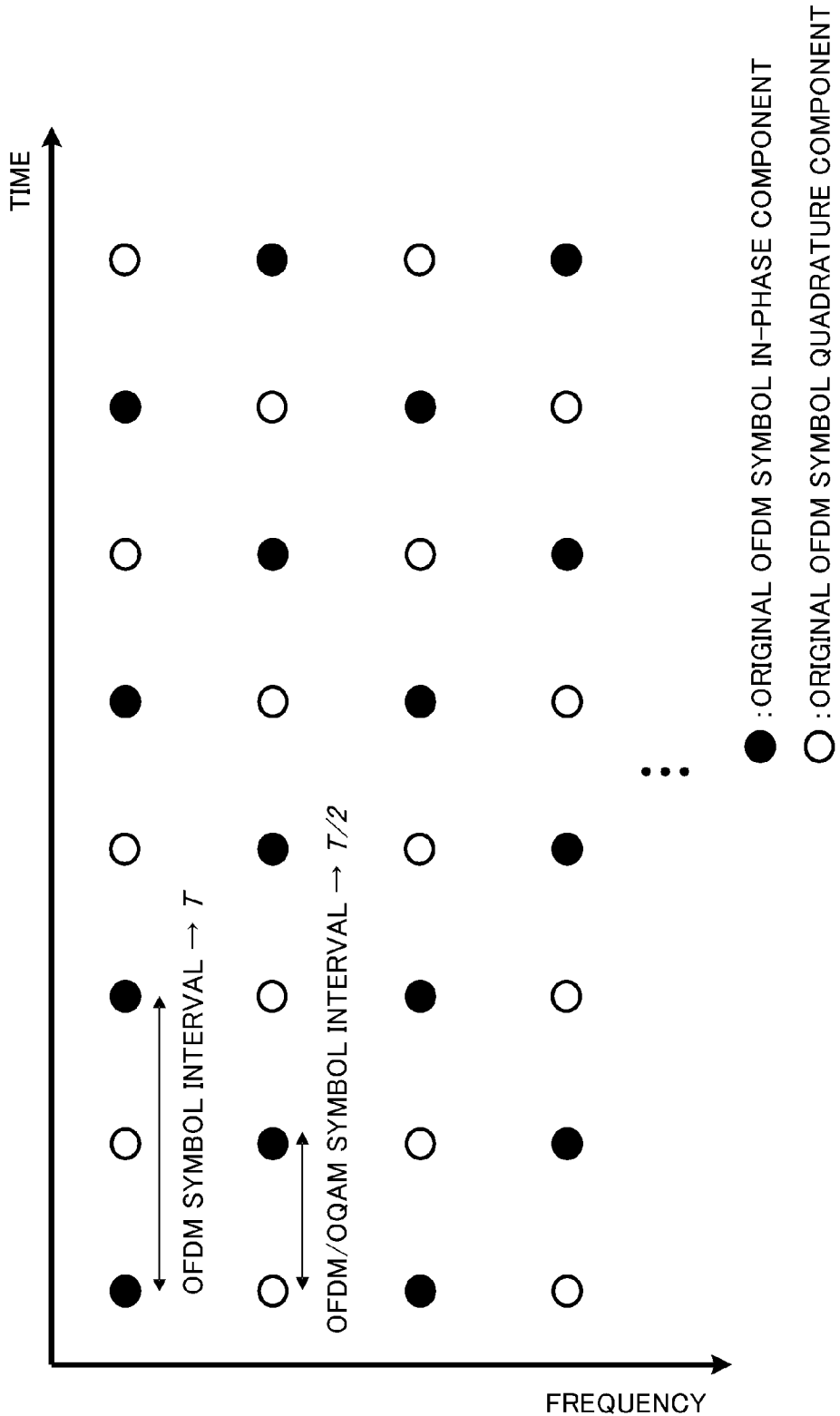
FIG. 4 is a diagram to show an example of an arrangement of OFDM/OQAM signal points.

FIG. 4 is a diagram to explain an example of an arrangement of OFDM/OQAM signal points. FIG. 4 shows frequency and time resources, and, furthermore, shows in-phase components that are arranged at intervals (=T/2) half the OFDM symbol cycle T (OFDM symbol interval). FIG. 4 shows a method of mapping the original in-phase components (black circles) and quadrature components (white circles) of OFDM symbols to the in-phase components of OFDM/OQAM symbols, alternately.

Also, in FIG. 3, the method of performing mapping-conversion of FTN symbols to OFDM/OQAM symbols is a method of projecting FTN symbols on OFDM/OQAM symbols and applying an IFFT. With this generation method, the FTN mapping/demapping process increases following an increase in the efficiency of FTN multiplexing, so that the volume of calculation is a little complex (medium). To change the efficiency of FTN multiplexing, the projection coefficient table needs to be changed. Meanwhile, since normal OFDM can be implemented by not employing FTN mapping, normal OFDM signals and FTN signals can be switched in a flexible manner.

Now, in existing LTE systems and wireless LANs, staggered arrangement, in which reference signals (RSs) for channel estimation are aligned alternately, is used. For the reference signals, for example, the CRS (Cell-Specific Reference Signal), the CSI-RS (Channel State Information-Reference Signal), the DM-RS (DeModulation-Reference Signal) and so on may be used. According to staggered arrangement, it is possible to accurately estimate frequency selective fading due to multipath, time-selective channel variations (Doppler shift) determined by the speed user terminals move.

Figure 5:
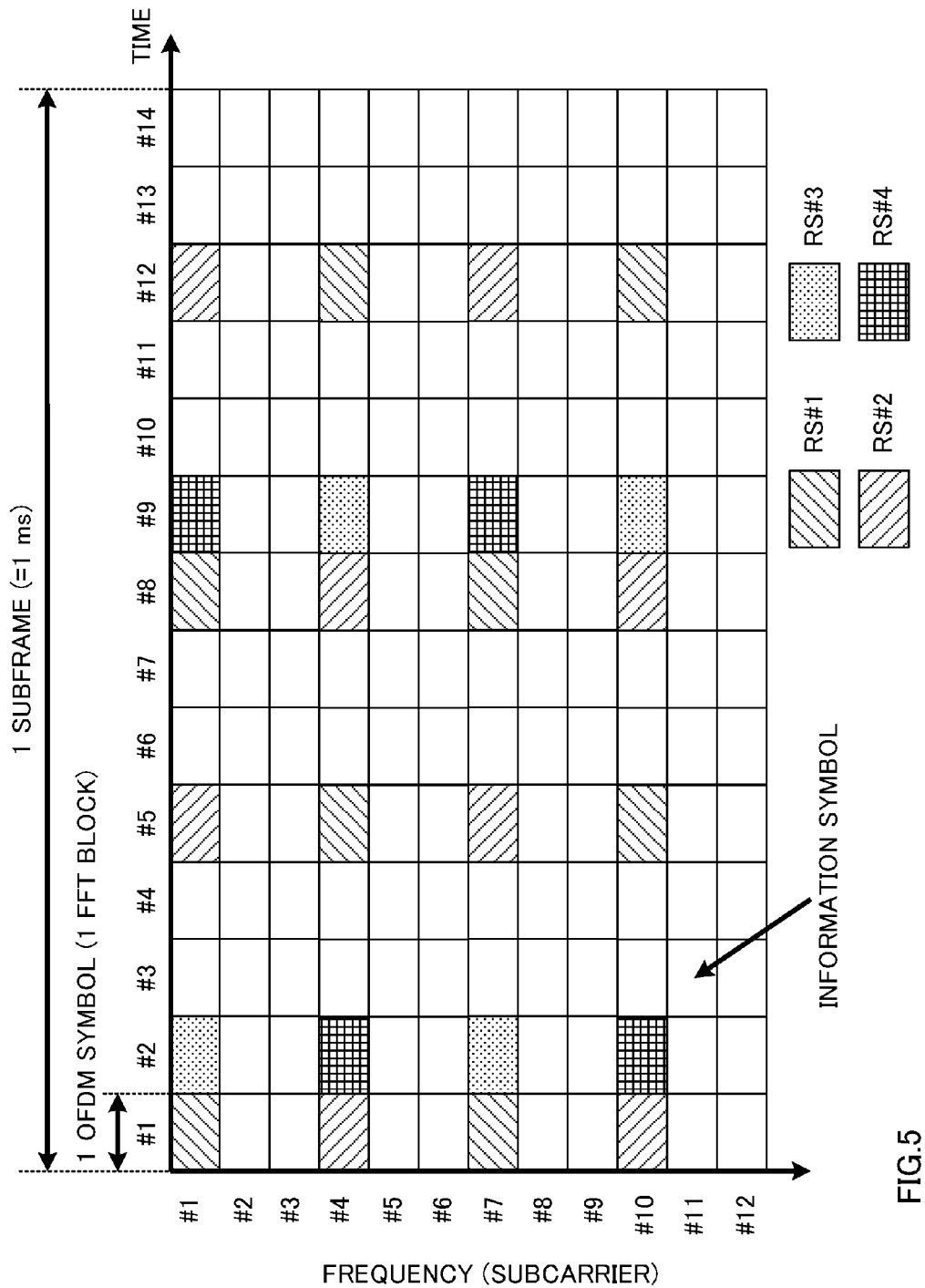
FIG. 5 is a diagram to explain an example of allocating reference signals of a plurality of antenna ports to radio resources in a staggered arrangement.

FIG. 5 is a diagram to explain an example of allocating reference signals of a plurality of antenna ports to radio resources in a staggered arrangement. FIG. 5 shows one RB (resource block), which is the minimum unit of radio resources subject to frequency scheduling. One RB is comprised of 12 subcarriers×14 symbols. Also, the radio resource region to occupy one subcarrier×one symbol is referred to as an RE (resource element).

In FIG. 5, reference signal RS #1 is arranged in symbols #1 and #8 of subcarriers #1 and #7, and in symbols #5 and #12 of subcarriers #4 and #10. Also, reference signal RS #2 is arranged in symbols #1 and #8 of subcarriers #4 and #10, and in symbols #5 and #12 of subcarriers #1 and #7. Also, reference signals RS #3 and RS #4 are also arranged, in a staggered arrangement, in resources that are different from those of the other reference signals.

In existing radio communication systems, orthogonal multiple access such as OFDMA is used, so that staggered arrangement is suitable for reference signals. However, when FTN is employed, FTN symbols in predetermined subcarrier locations cause significant ICI upon FTN symbols in many subcarrier locations on both sides.

Consequently, when staggered RS multiplexing is used in FTN, the reference signals suffer significant ICI from other FTN symbols, which results in increased errors in channel estimation. Also, when the symbol arrangement is adjusted so that ICI is not caused against staggered RSs, the information symbols to which FTN can be applied are very limited, and the effect of improving spectral efficiency by means of FTN cannot be achieved.

In view of the above, when staggered RS multiplexing is used with FTN, interference against reference signals is the problem.

In order to solve this problem, the present inventors have come up with the idea of orthogonal-multiplexing predetermined symbols so as not to suffer ISI and ICI from FTN symbols in a radio communication system in which FTN is used. To be more specific, the present inventors have come up with the idea of time-division-multiplexing (TDM) transmission signals over a first radio resource region in which symbols are multiplexed at a rate equal to or lower than the Nyquist rate, and over a second radio resource region where symbols are multiplexed at a faster rate than the Nyquist rate.

According to this configuration, interference (ICI, ISI, etc.) against the symbols in the first radio resource region can be reduced. Also, since reference signal symbols are multiplexed in the first radio resource region as symbols, it is possible to reduce the impact of interference in the radio resource locations where the reference signals are allocated.

Now, the transmitting/receiving processes in the event FTN is applied to OFDM/OQAM will be described with a first embodiment, and TDM in the first radio resource region and the second radio resource region will be described with a second embodiment. Note that the first radio resource region will be hereinafter referred to as the "orthogonal multiplexing part," and the second radio resource region will be referred to as the "non-orthogonal multiplexing part."

First Embodiment

The first embodiment pertains to the transmitting/receiving processes in the event FTN is applied to OFDM/OQAM. For ease of explanation, a case will be described below where signals, to which FTN is applied, are transmitted from the transmitting end (FTN transmitter), provided with an FTN transmission processing section 300, to the receiving end (FTN receiver), provided with an FTN reception reception processing section 400. For example, a structure may be employed here in which a radio base station is used as the FTN transmitter and a user terminal is used as the FTN receiver. However, the above configuration is by no means limiting, and any radio communication method may be used as long as the steps of processes for implementing the FTN transmission processing section 300 and the FTN reception reception processing section 400 are provided. For example, when the user terminal can transmit OFDM/OQAM signals, a configuration may be employed in which the user terminal has the FTN transmission processing section 300 and the radio base station has the FTN reception reception processing section 400.

(FTN Transmission Processing Section)

Figure 6:
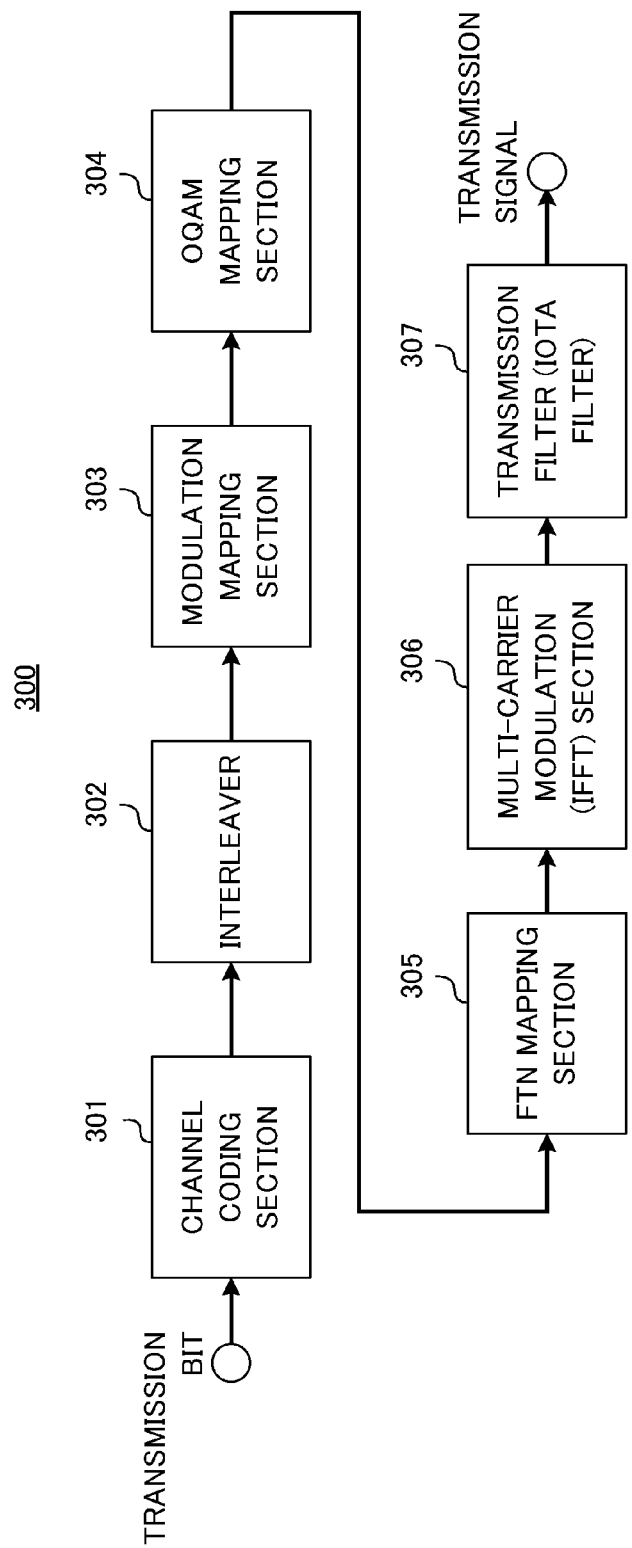
FIG. 6 is a diagram to show an example of a transmission processing section for signals applying FTN to OFDM/OQAM, according to a first embodiment.

FIG. 6 shows an example of a transmission processing section for signals applying FTN to OFDM/OQAM according to a first embodiment. The FTN transmission processing section 300 is comprised at least of a channel coding sections 301, an interleaver 302, a modulation mapping section 303, an OQAM mapping section 304, an FTN mapping section 305, a multi-carrier modulation (IFFT) section 306 and a transmission filter (IOTA filter) 307. Note that it is equally possible to employ a structure in which more than of every section is provided so that parallel processing can be executed. Also, a structure may be employed in which a plurality of transmission signals can be transmitted in parallel.

The channel coding sections 301 applies error correction coding (channel coding) to transmission bits that are received as input, and outputs the result to the interleaver 302. For example, turbo code can be used in channel coding.

In order to prevent the bits encoded in the channel coding section 301 from getting lost in bursts, the interleaver 302 inter-leaves the bits and outputs the result to the modulation mapping section 303.

The modulation mapping section 303 performs modulation mapping (data modulation) of the bits interleaved in the interleaver 302. As for the modulation scheme, for example, digital modulation schemes such as QPSK (Quadrature Phase Shift Keying), 16QAM (Quadrature Amplitude Modulation), 64QAM can be used. Although QPSK is used with the present embodiment, this is by no means limiting.

Note that the channel coding sections 301 and the modulation mapping section 303 can determine the channel coding rate and the modulation scheme based on channel state information (CSI) that is fed back from the FTN receiver, and perform the channel coding process and the modulation process in accordance with the channel coding rate and the modulation scheme.

The OQAM mapping section 304 applies OQAM mapping (OQAM conversion) to the input from the modulation mapping section 303, and outputs the result to the FTN mapping section 305. According to the present embodiment symbols having been subjected to OQAM conversion are densely multiplexed in FTN (that is, arranged at a symbol rate faster than the Nyquist rate) and therefore will also be referred to as "FTN symbols."

The FTN mapping section 305 applies FTN mapping to the FTN symbols input from the OQAM mapping section 304, and outputs the result to the IFFT section 306. By means of FTN mapping, the OFDM/OQAM symbols to be actually transmitted are generated. That is, a plurality of FTN symbol signals are superimposed in each OFDM/OQAM symbol. The FTN mapping will be described in greater detail later.

The IFFT section 306 converts the OFDM/OQAM symbols having been subjected to FTN mapping in the FTN mapping section 305 into time domain signals by applying an IFFT, and outputs the result to the transmission filter 307.

The transmission filter 307 applies band limitation to the signals converted in the IFFT section 306 by using a transmission filter, and outputs the result as transmission signals. Although, according to the present embodiment, an IOTA (Isotropic Orthogonal Transform Algorithm) filter is used as the transmission filter, this is by no means limiting. The band limitation by the transmission filter will be described later.

(FTN Mapping)

Figure 7:
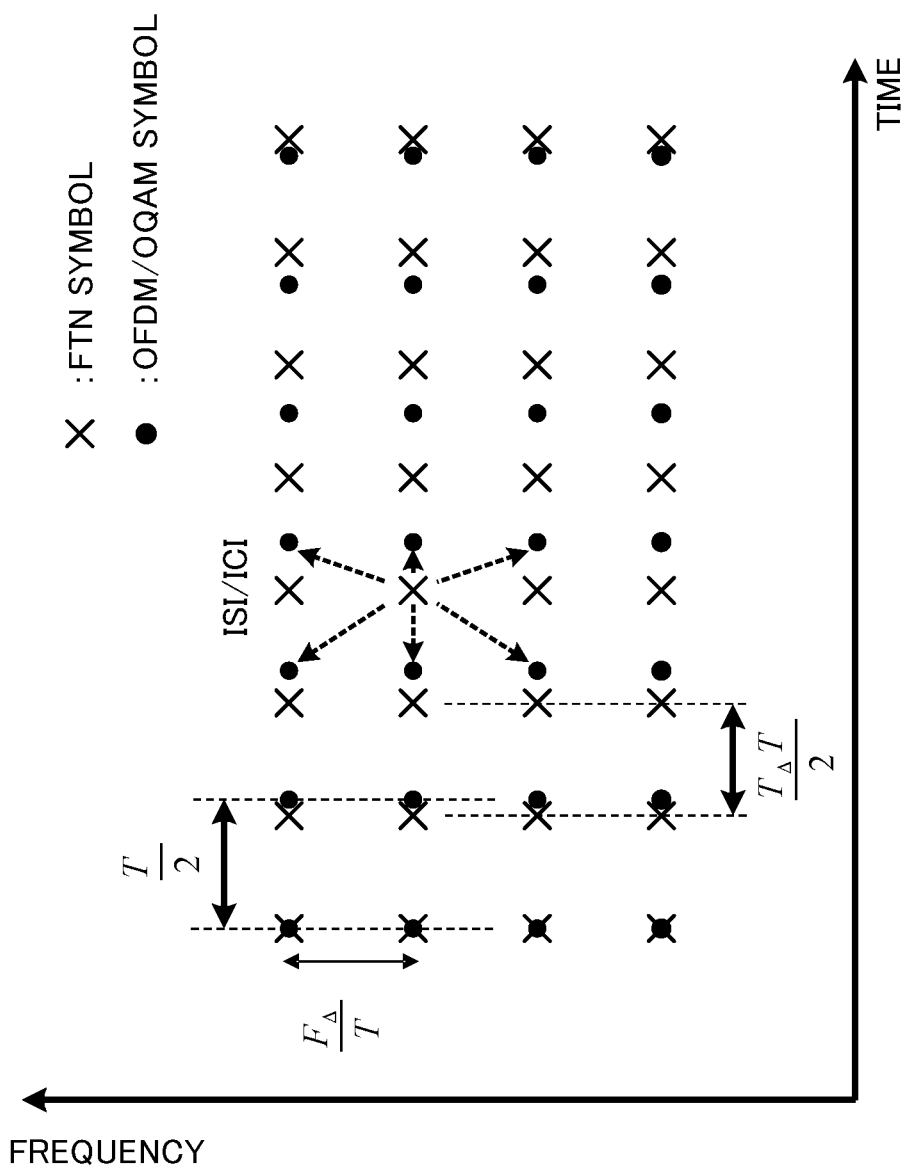
FIG. 7 is a diagram to explain a mapping process of FTN symbols to OFDM/OQAM symbols according to the first embodiment.

Now, an embodiment of the present invention will be described below in detail with reference to the accompanying drawings. FIG. 7 is a conceptual diagram to explain the concept of the mapping process of FTN symbols to OFDM/OQAM symbols according to the first embodiment. With the first embodiment, the FTN symbols are represented as an orthogonal basis function of the OFDM/OQAM symbol interval, thereby making the conventional IFFT applicable.

As shown in FIG. 7, in OFDM/OQAM, generally, OFDM in-phase components and quadrature components are mapped only to in-phase components of a cycle half the OFDM symbol cycle T (=T/2). A transmission signal s(t) by OFDM/OQAM can be represented in by an equation 1.

$$s(t) = \sum_{l=-\infty}^{\infty} \sum_{k=0}^{N-1} j^{k+l} x_{k,l} p\left(t - l\frac{T}{2}\right) e^{j\frac{2\pi kt}{T}} \qquad \text{(Equation 1)}$$

In equation 1, k and l are the subcarrier index and the symbol index, respectively. $x_{k,l}$ is a data symbol of a real number value having only an in-phase component to which a phase offset $j^{k+l}$ is applied. p(t) is a rectangular signal of cycle T in the event of an OFDM signal.

On the other hand, in the event of a transmission signal to which FTN is applied, the symbol interval is $T_A T/2$ and the subcarrier interval is $F_A/T$, with respect to FTN symbols using OFDM/OQAM. Here, $T_A$ is the compression factor of the time domain symbols of FTN signals, and $F_A$ is the compression factor of the frequency domain symbols of FTN signals. Note that the product of the symbol interval and the subcarrier interval of FTN symbols becomes $T_A F_A/2$. Assuming that T is the Nyquist interval, $T_A F_A = 1$ gives normal OFDM/OQAM signals, and $T_A F_A < 1$ gives FTN signals.

Also, with the present embodiment, waveform shaping (band limitation) is executed by applying a Gaussian filter to FTN signals in order to increase the locality of time and frequency.

In view of the above, an FTN symbol waveform $g_{k,l}(t)$ having been subjected to band limitation using a Gaussian filter g(t) can be represented by an equation 2.

$$g_{k,l}(t) \equiv j^{k+l} g\left(t - lT_A \frac{T}{2}\right) e^{j\frac{2\pi k F_\Delta t}{T}} \quad \text{(Equation 2)}$$

From equation 1 and equation 2, an FTN signal having been subjected to band limitation through a Gaussian filter g(t) can be represented by an equation 3.

$$s(t) = \quad \text{(Equation 3)}$$

$$\sum_{l=-\infty}^{\infty} \sum_{k=0}^{N-1} x_{k,l} g_{k,l}(t) = \sum_{l=-\infty}^{\infty} \sum_{k=0}^{N-1} j^{k+l} x_{k,l} g\left(t - lT_A \frac{T}{2}\right) e^{j\frac{2\pi k F_\Delta t}{T}}$$

In order to make the conventional IFFT applicable to the FTN signal of equation 3, in the FTN mapping of the first embodiment, the FTN symbol waveform $g_{k,l}(t)$ is represented by an orthogonal basis function of the OFDM/OQAM symbol interval. The time waveform $\{\varphi_{m,n}(t)\}$ of this orthogonal basis function is defined with an equation 4.

$$\varphi_{m,n}(t) \equiv j^{n+m} \varphi\left(t - n\frac{T}{2}\right) e^{j\frac{2\pi m t}{T}} \quad \text{(Equation 4)}$$

In equation 4, m and n represent the subcarrier index and the symbol index of the orthogonal basis function, respectively.

The FTN symbol waveform of equation 2 having been subjected to band limitation using a Gaussian filter can be projected on the orthogonal basis function of equation 4 by using a projection coefficient (FTN mapping coefficient) $C_{k,l,m,n}$. As shown in an equation 5, $C_{k,l,m,n}$ can be calculated from the inner product of $g_{k,l}(t)$ of equation 2 and $\varphi_{m,n}(t)$ of equation 4.

$$C_{k,l,m,n} = \langle g_{k,l}(t), \varphi_{m,n}(t) \rangle = \Re\left\{\int g_{k,l}(t) \varphi_{m,n}^*(t) dt\right\} \quad \text{(Equation 5)}$$

where $\Re\{z\}$ is the real part of the complex number z, and $\varphi_{m,n}^*$ is the conjugate of $\varphi_{m,n}$.

In other words, the projection coefficient $C_{k,l,m,n}$ is the interference factor as caused from the FTN symbol arranged in the location of a subcarrier k and a symbol l to a subcarrier m and a symbol n of the orthogonal basis function $\varphi_{m,n}(t)$.

By using the projection coefficient $C_{k,l,m,n}$, the FTN signal of equation 3 can be represented by an equation 6.

$$s(t) = \sum_{l=-\infty}^{\infty} \sum_{k=0}^{N-1} \sum_{m,n} x_{k,l} C_{k,l,m,n} \varphi_{m,n}(t) \quad \text{(Equation 6)}$$

As described above, the FTN mapping section 305 converts the FTN symbol $x_{k,l}$ of a symbol interval $T_A T/2$ and a subcarrier interval $F_A/T$ into an OFDM/OQAM symbol $x'_{m,n}$ of a symbol interval $T/2$ and a subcarrier interval $F_A/T$ by applying an equation 7. That is, the FTN mapping section 305 maps a symbol (FTN symbol), in which the product of the symbol interval and the subcarrier interval ($T_A F_A/2$) is less than ½, to an OFDM/OQAM (Orthogonal Frequency Division Multiple Access/Offset Quadrature Amplitude Modulation) symbol, in which the product of the symbol interval and the subcarrier interval is ½.

$$x'_{m,n} = x_{k_1,l_1} C_{k_1,l_1,m,n} + x_{k_2,l_2} C_{k_2,l_2,m,n} + \quad \text{(Equation 7)}$$

$$x_{k_3,l_3} C_{k_3,l_3,m,n} + \ldots$$

$$= \sum_{p,q} x_{k_p,l_q} C_{k_p,l_q,m,n}$$

In equation 7, p and q are the numbers of time directions and frequency directions of the symbol to use in projection.

From equation 6 and equation 7, an FTN signal can be further represented by an equation 8.

$$s(t) = \sum_{n=-\infty}^{\infty} \sum_{m=0}^{N-1} x'_{m,n} \varphi_{m,n}(t) \quad \text{(Equation 8)}$$

Figure 8:
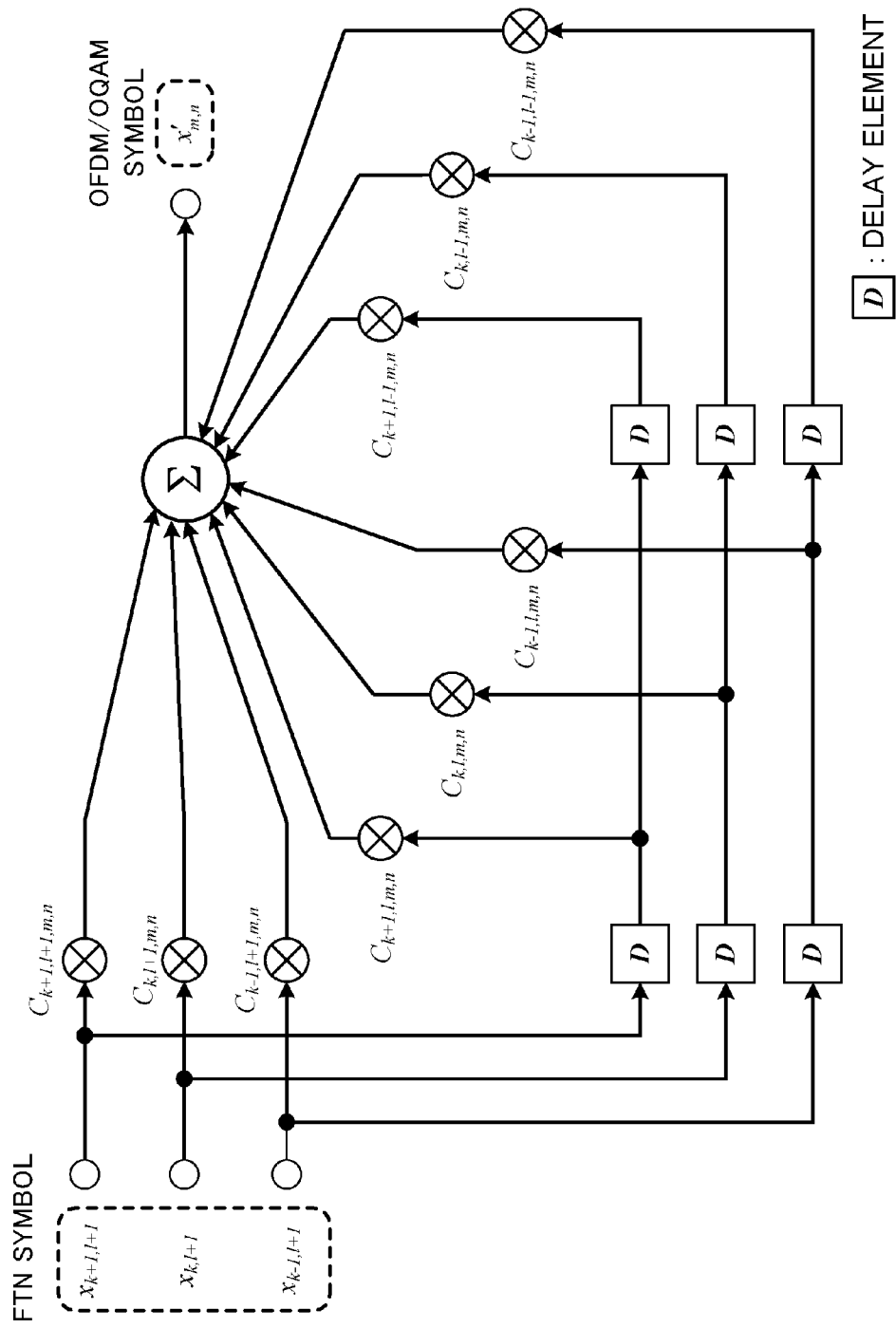
FIG. 8 is a diagram to show an example of an FTN mapping configuration in the event p=3 and q=3 hold.

FIG. 8 shows an example of an FTN mapping configuration in the event of p=3 and q=3. In this example, from a total of nine FTN symbols $x_{k+1,l+1}$, $x_{k,l+1}$, $x_{k-1,l+1}$, $x_{k+1,l}$, $x_{k,l}$, $x_{k-1,l}$, $x_{k+1,l-1}$, $x_{k,l-1}$ and $x_{k-1,l-1}$ one OFDM/OQAM symbol $x'_{m,n}$ is generated. Although FIG. 8 shows a structure in which the conversion of equation 7 is executed with delay elements, multipliers and adders, this structure is by no means limiting.

(Band Limitation Using Transmission Filter)

Now, the band limitation by the transmission filter 307 of FIG. 6 will be described below in detail. With the first embodiment, as the above-described orthogonal basis function $\varphi_{m,n}(t)$, an IOTA pulse (IOTA window function) is used, instead of the rectangular window that is used in normal OFDM, in order to improve the locality of the projection of an FTN symbol on the basis function. This can be implemented by applying an IOTA filter to the IFFT waveform.

When, as in OFDM, the sine wave of a rectangular window is used for the orthogonal basis function—that is, when $\varphi(t) = rect(t)$ (rect(t) is a rectangular function)—the transmission signal s(t) can be represented by an equation 9.

$$s(t) = \sum_{n=-\infty}^{\infty} \sum_{m=0}^{N-1} j^{n+m} x'_{m,n} \cdot rect\left(t - n\frac{T}{2}\right) e^{j\frac{2\pi m t}{T}} \quad \text{(Equation 9)}$$

The frequency domain waveform of the sine wave of the rectangular window is a sinc function, so that when FTN symbols are projected on OFDM/OQAM symbols, the subcarrier interference (ICI) stretches over a wide range.

When the frequency and time region for FTN mapping is expanded by increasing p and/or q (equation 7), ICI can be reduced, but the amount of calculation increases. Also if the frequency and time region for FTN mapping expands, the power of each FTN symbol multiplexed in the locations of OFDM/OQAM symbols becomes very low. Consequently, if the FTN receiver actually carried out channel estimation using the OFDM/OQAM symbols, there is a threat that the accuracy of soft decision symbol estimation values according to the turbo SIC deteriorates.

On the other hand, when an IOTA pulse is used for the orthogonal basis function, the transmission signal s(t) can be represented by an equation 10.

$$s(t) = \sum_{n=-\infty}^{\infty} \sum_{m=0}^{N-1} j^{m+n} x'_{m,n} \cdot \Im\left(t - n\frac{T}{2}\right) e^{j\frac{2\pi m t}{T}} \quad \text{(Equation 10)}$$

where $\Im(t)$ is an IOTA window function—that is, the IOTA filter's time response (impulse response).

Figure 9:
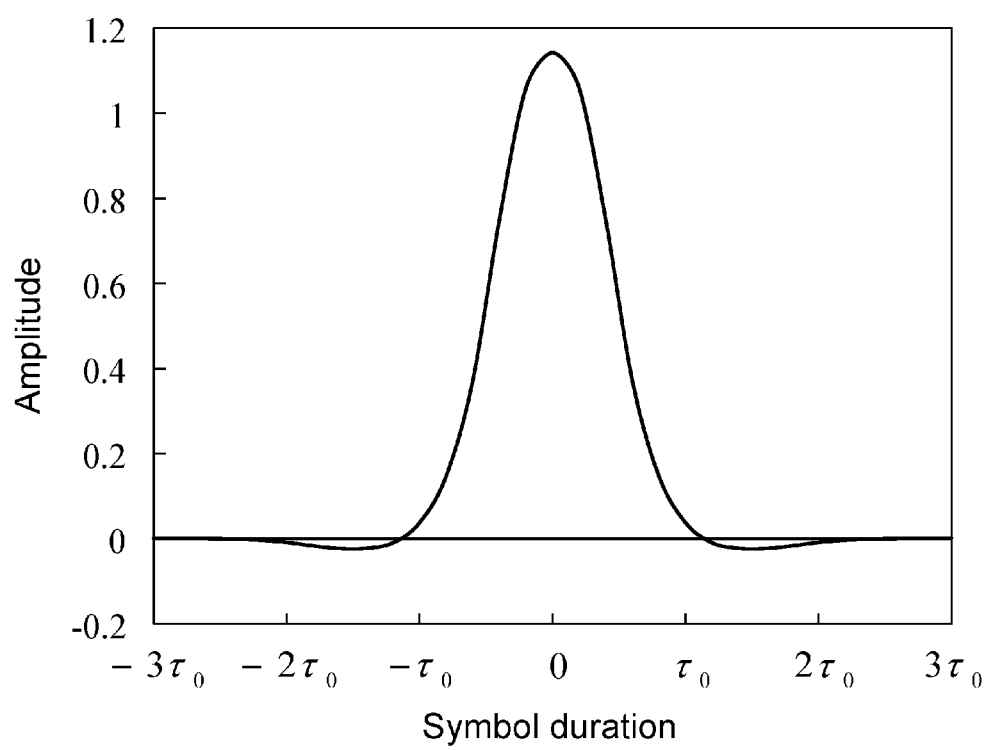
FIG. 9 is a diagram to show an example of a time response of an IOTA filter.

The IOTA filter is basically a Gaussian function, so that a time response and a frequency response of the same shape can be implemented. FIG. 9 is a diagram to show an example of a time response of an IOTA filter. In FIG. 9, $\tau_0$ is the OFDM/OQAM symbol duration. As shown in FIG. 9, the IOTA filter exhibits good convergence performance in the time domain.

Figure 10:
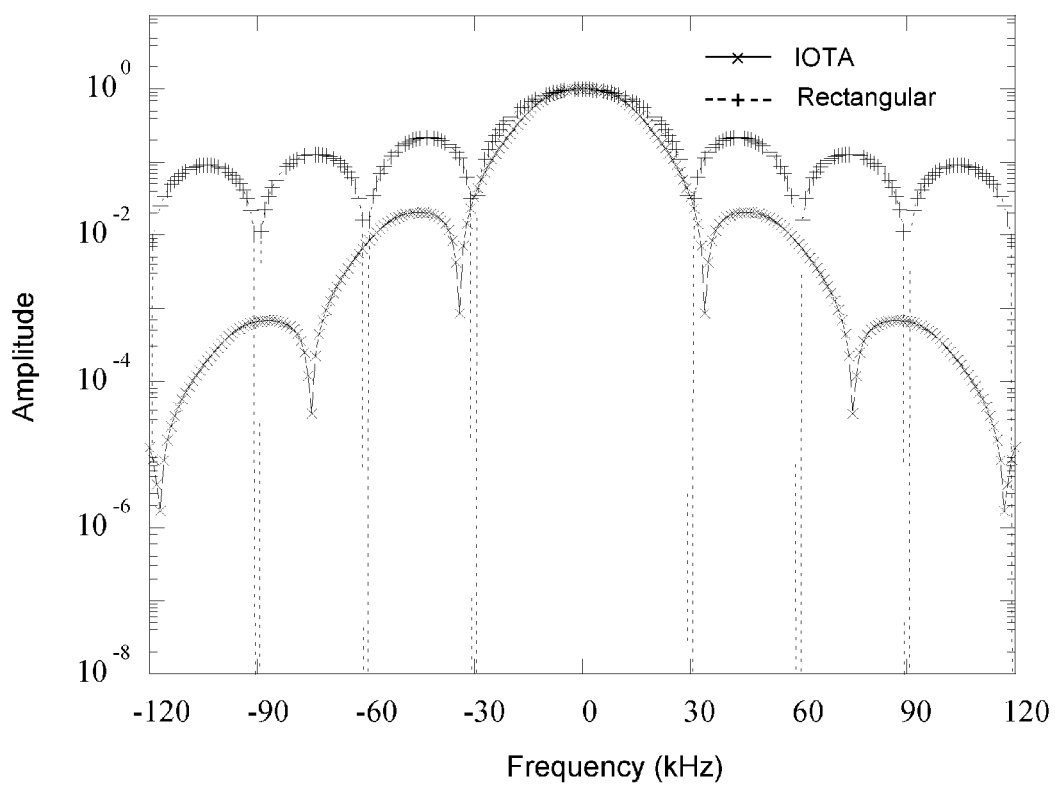
FIG. 10 is a diagram to show examples of frequency responses in the event an IOTA and a rectangular window function are used.

FIG. 10 is a diagram to show examples of frequency responses when the IOTA and rectangular window functions are used, respectively. These examples presume LTE radio parameters, and the OFDM/OQAM subcarrier intervals is 30 kHz (the original OFDM subcarrier interval is 15 kHz). As shown in FIG. 10, when an IOTA function is employed, it is possible to reduce the leakage of power to neighboring subcarriers, compared to when an rectangular function is employed.

As described above, by applying an IOTA filter, it is possible to achieve good convergence performance in the time and frequency domains. Consequently, from the perspective of reducing the amount of calculation in the FTN mapping section (equation 7) and improving the accuracy of soft decision symbol estimation values by the turbo SIC, with the first embodiment, the spread of FTN symbols over OFDM/OQAM symbols is narrowed and the interference power is made more localized, by applying an IOTA filter.

If the number of IFFT/FFT sampling points is N and the IFFT/FFT sampling cycle is $T_s(=T/N)$, equation 10 can be modified, by using an integer p, as shown in an equation 11.

$$s(pT_s) = \sum_{n=-\infty}^{\infty} \Im\left(pT_s - n\frac{T}{2}\right) \cdot X'_n(pT_s) \quad \text{(Equation 11)}$$

where $$X'_n(t) = \sum_{m=0}^{N-1} j^{m+n} x'_{m,n} e^{j\frac{2\pi m t}{T}}$$

holds.

Equation 11 represents that an IOTA filter is applied to $X'_n(pT_s)$, which represents the signal part after the IFFT.

(FTN Reception Reception Processing Section)

Figure 11:
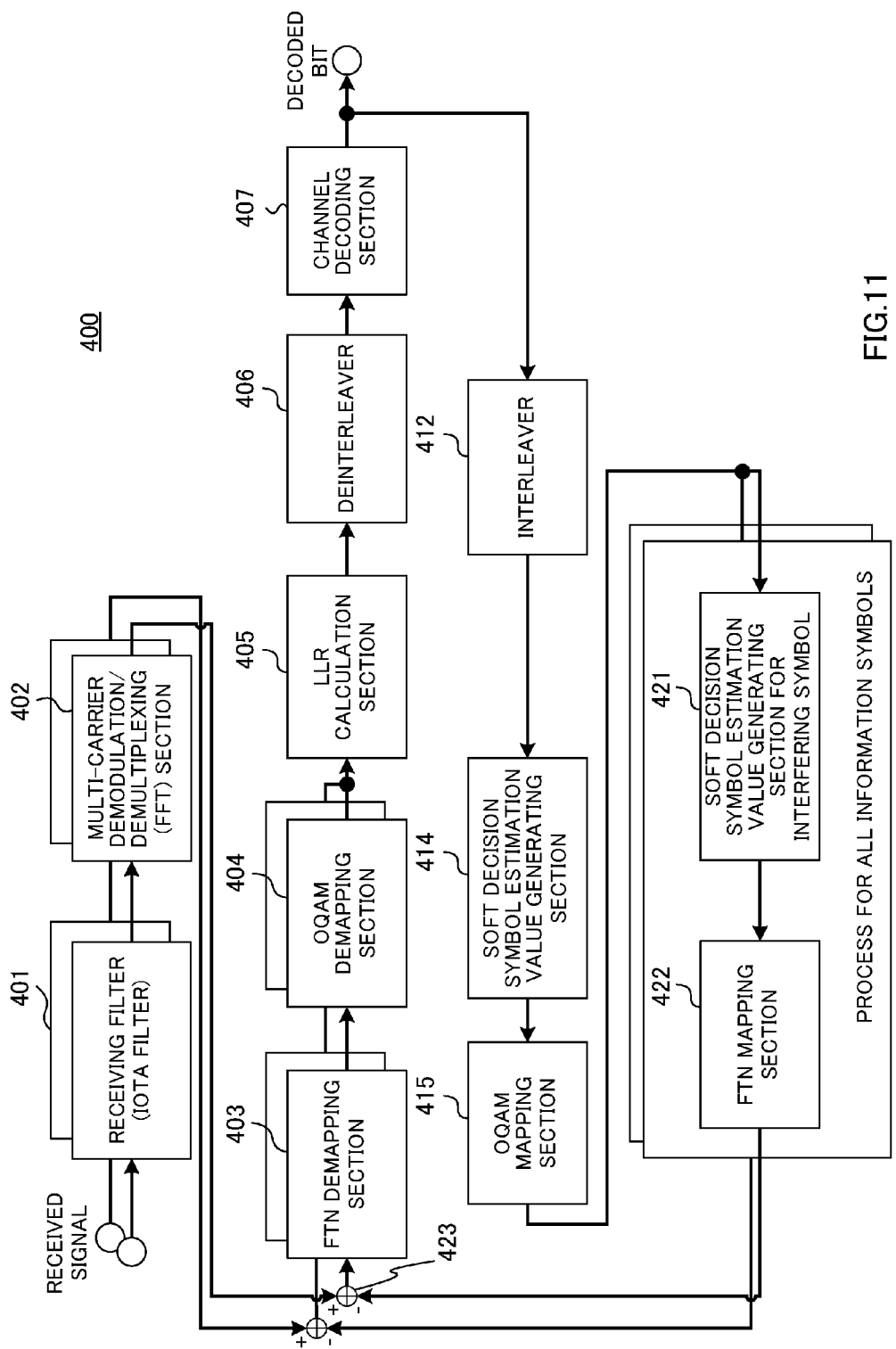
FIG. 11 is a diagram to show an example of a reception reception processing section for signals applying FTN to OFDM/OQAM, according to the first embodiment.

FIG. 11 shows a reception reception processing section for signals applying FTN to OFDM/OQAM, according to the first embodiment. The FTN reception reception processing section 400 is comprised at least of a receiving filter (IOTA filter) 401, a multi-carrier demodulation/demultiplexing (FFT) section 402, an FTN demapping section 403, an OQAM demapping section 404, an LLR calculation section 405, a deinterleaver 406, a channel decoding section 407, an interleaver 412, a soft decision symbol estimation value generating section 414, an OQAM mapping section 415, a soft decision symbol estimation value generating section 421 for interfering symbols, an FTN mapping section 422, and a combining section 423. Note that a structure may be employed in which more than one of each section is provided so that parallel processing can be executed. For example, in FIG. 11, the FFT sections 402 and/or others are capable of parallel processing. Also, the FTN reception reception processing section 400 may have a function for estimating channel response.

The receiving filter 401 applies an IOTA filtering process to a received signal that is input, and outputs the result to the FFT section 402.

The FFT section 402 applies multi-carrier demodulation/demultiplexing by way of an FFT, converts the time domain signal into a frequency domain signal, and outputs the symbols of each subcarrier location in OFDM/OQAM to the combining section 423.

The combining section 423 subtracts the soft decision symbol estimation value of an interfering symbol, which will be described later, from the received signal after the FFT process in the FFT section 402, and outputs the result to the FTN demapping section 403. Note that the combining section 423 may be configured to output the received signal after the FFT process on an as-is basis, by subtracting 0 or by performing no process, when there is no soft decision symbol estimation value of interfering symbol that is calculated, such as during the first round of the turbo SIC process.

The FTN demapping section 403 applies a demapping process for reconstructing FTN symbols to the OFDM/OQAM symbols that are input from the combining section 423, by using a matched filter (MF), and outputs the FTN symbols to the OQAM demapping section 404. In FTN demapping, it is preferable to use the same projection coefficient $C_{k,l,m,n}$ as that used in the FTN mapping section 305 of the FTN transmitter. An FTN symbol in the location of a subcarrier k and a symbol l after FTN demapping can be represented by an equation 12.

$$\bar{x}_{k,l} = \sum_{m,n} C_{k,l,m,n} \hat{h}^* h_{m,n} x'_{m,n} + \eta'_{k,l} \quad \text{(Equation 12)}$$

where $\hat{h}^*$ is the conjugate of the estimated value of channel response. $h_{m,n}$ is the channel response in the location of a subcarrier m and a symbol n. When channel response is estimated by using reference signals, since, generally, channel response is averaged over one subframe and a number of subcarrier periods, $h_{m,n} \approx \hat{h}$ can be assumed within the FTN mapping range $(=N_t \times N_f)$. $N_t$ and $N_f$ represent the ranges of OFDM/OQAM symbols in the time and frequency domains where the FTN symbol causes ISI and ICI. Also, $\eta'_{k,l}$ is the noise component in the FTN symbol location after demapping.

As shown in equation 12, by gathering FTN symbols that are mapped in a plurality of OFDM/OQAM symbol locations, FTN symbols of interest are reconstructed. By using equation 7, the FTN symbol in the location of a symbol $l_1$ in a subcarrier $k_1$ in equation 12 can be represented by an equation 13.

$$\bar{x}_{k_1,l_1} = \sum_{m,n} C_{k_1,l_1,m,n} \hat{h}^* h_{m,n} \left( x_{k_1,l_1} C_{k_1,l_1,m,n} + \sum_{(k_p,l_q) \neq (k_1,l_1)} x_{k_p,l_q} C_{k_p,l_q,m,n} \right) + \eta'_{k_1,l_1}$$

(Equation 13)

In equation 13, the first term in parentheses on the right side represents the FTN symbol of interest in the location $(k_1,l_1)$. Also, the second term in parentheses represents the ISI and ICI from other FTN symbols in the location $(k_1,l_1)$ of the FTN symbol. As can be seen in equation 13, the FTN symbol in a predetermined location suffers the impact of ISI and ICI from other FTN symbols in the course of the demapping process.

Given the FTN symbol input from the FTN demapping section 403, the OQAM demapping section 404 acquires a modulated symbol through OFDM/OQAM demapping. Also, the modulated symbol is subjected to a demodulation process, and output to the LLR calculation section 405.

Based on the demodulated symbol input from the OQAM demapping section 404, the LLR calculation section 405 calculates a-posteriori log-likelihood ratio (a-posteriori LLR), and outputs this to the deinterleaver 406. For example, the a-posteriori LLR may be calculated using a max-log-MAP decoder. Note that it is preferable, before calculating the LLR, to apply a linear minimum meansquare error (LMMSE) interference reduction filter.

The deinterleaver 406 de-interleaves the symbol demodulated in the LLR calculation section 405, and outputs the result to the channel decoding section 407.

The channel decoding section 407 calculates the a-posteriori LLRs of the information bits and the parity bits from the symbol deinterleaved in the deinterleaver 406.

With the first embodiment, turbo SIC-based interference cancellation is applied in order to separate each modulated symbol. To be more specific, the iterative process of generating a soft decision estimation value of an interfering symbol based on the a-posteriori LLR and subtracting this from received signals is performed. As for configuration of the turbo SIC, after a number of symbols to match the number of receiving diversity branches are combined inphase, the a-posteriori LLR of each bit may be calculated by calculating the square Euclidian distances between the combined signal and a receiving symbol replica of the combination of all transmission signals.

When iterative decoding is performed with the turbo SIC, a transmission signal is generated by performing the same process as in the FTN transmission processing section 300 by using the information symbols output from the channel decoding section 407, and soft decision symbol estimation values of interfering symbols are generated. The interleaver 412 and OQAM mapping section 415 may be configured the same as for the above-described processes on the transmitting end (the interleaver 302 and the OQAM mapping section 304), and therefore will not be described again.

Also, in FIG. 11, the soft decision symbol estimation value generating section 414 generates the soft decision symbol estimation values in all OFDM symbol (or OFDM/OQAM symbol) locations in all subcarriers based on the LLR of each information bit and parity bit output from the interleaver 412.

Also, the soft decision symbol estimation value generating section 421 for interfering symbols generates the soft decision symbol estimation values of interfering symbols based on the FTN symbols output from the OQAM mapping section 415. The soft decision symbol estimation values of interfering symbols refer to the soft decision estimation values of the information symbols in symbol locations in all subcarriers from which interference may be caused against predetermined information symbols of interest. To be more specific, the soft decision symbol estimation value generating section 421 for interfering symbols calculates signals by subtracting the soft decision symbol estimation value of a symbol of interest from all of the soft decision symbol estimation values generated in the soft decision symbol estimation value generating section 414.

In loops apart from the final iteration by the turbo SIC, the a-posteriori LLRs of encoded bits are used to generate the soft decision symbol estimation value of each transmission stream. Note that, although, normally, external LLRs are used to generate soft decision symbol estimation values, it is preferable to use a-posteriori LLRs with the first embodiment. When the interference level is high, a better error rate can be achieved by using a-posteriori LLRs than by using external LLRs.

The FTN mapping section 422 maps the symbol estimation values of subcarrier locations to cause interference against a symbol of interest based on the soft decision symbol estimation values of interfering symbols (equation 7). The configuration of FTN mapping may be made the same as in the FTN mapping section 305.

Then, the combining section 423 subtracts, from the received signals having been subjected to the FFT process in the FFT section 402, the soft decision symbol estimation values of interfering symbols output from the FTN mapping section 422. By this means, the impact of ISI and ICI upon the symbol of interest can be reduced.

When the process of subtracting the soft decision symbol estimation values of interfering symbols is applied to all of the information symbols, one round of the iterative process is complete. In the next round of the iterative process, the process of the FTN demapping section 403 and later processes are applied again to signals output from the preceding re iterative process.

In the final iterative loop by the turbo SIC, the a-posteriori LLR of the max-log-MAP decoder output is subjected to hard decision, thereby reconstructing the transmitting bit sequences (decoding bits). When the number of iterations for a predetermined received signal reaches a predetermined number of times (for example, $N_{itr}$ times), the FTN reception reception processing section 400 may judge that the loop is the final iteration, and output decoding bits.

As described above, according to the first embodiment, FTN is implemented with OFDM/OQAM symbols, so that throughput can be improved compared to normal OFDM.

Second Embodiment

According to a second embodiment, time-division-multiplexing (TDM) is executed over a first radio resource region (orthogonal multiplexing part) where symbols are multiplexed at a rate equal to or below the Nyquist rate and a second radio resource region (non-orthogonal multiplexing part) where symbols are multiplexed at a faster rate than the Nyquist rate, and reference signals are allocated to the orthogonal multiplexing part.

According to the second embodiment, normal OFDM (or OFDM/OQAM) is applied to the time (symbols) where the orthogonal multiplexing part is configured, and FTN is applied to the time (symbols) where the non-orthogonal multiplexing part is configured. By this means, it is possible to reduce the impact of ISI and ICI from FTN symbols against the radio resources where reference signals are allocated.

Now, a case will be described below where the second embodiment is applied to the scheme of the first embodiment. Note that the radio communication scheme to which the second embodiment is applied has only to be a radio communication scheme that employs FTN, and is by no means limited to the scheme of the first embodiment.

Figure 12:
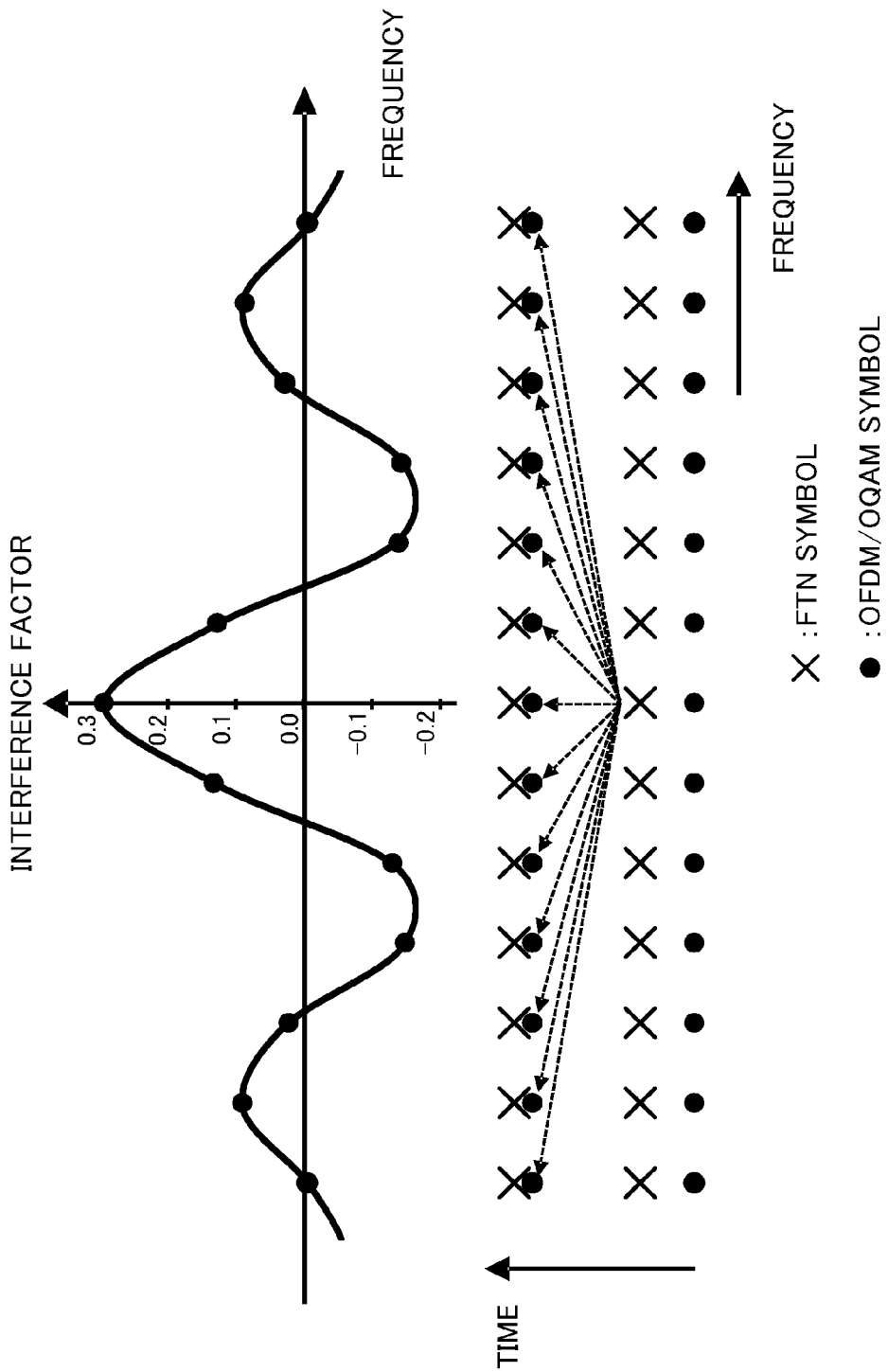
FIG. 12 is a diagram to show an example of interference which an FTN symbol in a predetermined subcarrier location causes against OFDM/OQAM symbols in each subcarrier location.

FIG. 12 is a diagram to show an example of interference which an FTN symbol in a predetermined subcarrier location causes against OFDM/OQAM symbols in each subcarrier location. When FTN symbols are arranged as shown in the lower part of FIG. 12, for example, the FTN symbol at the center of the drawing may be mapped in FTN to a wide range of OFDM/OQAM symbols.

The upper part of FIG. 12 shows the interference which the FTN symbol at the center of the drawing causes against other OFDM/OQAM symbols. Here, the interference factor can be represented by, for example, the projection coefficient $C_{k,l,m,n}$ of the first embodiment. In this way, FTN mapping, may result in producing ICI may in OFDM/OQAM symbols in many subcarrier locations.

Figure 13:
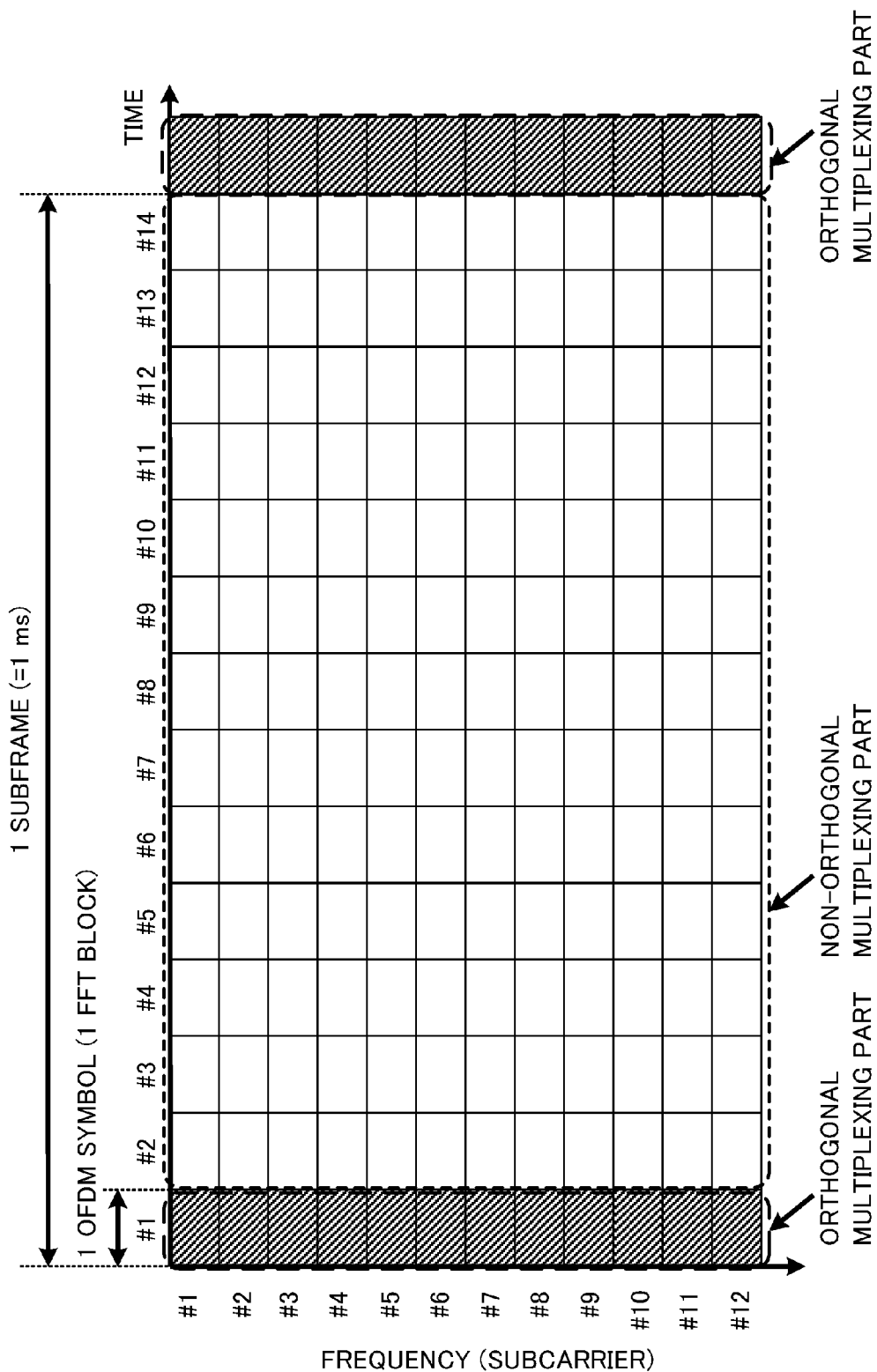
FIG. 13 is a diagram to show an example of multiplexing of reference signals according to a second embodiment.

FIG. 13 is a diagram to show an example of multiplexing of reference signals according to the second embodiment. In FIG. 13, symbol #1, which is the first symbol in each subframe, is configured as the orthogonal multiplexing part, and reference signal symbols are allocated in regions within this orthogonal multiplexing part. On the other hand, symbols #2 to #14 in each subframe are configured as the non-orthogonal multiplexing part where FTN is applied, and symbols apart from reference signals (for example, data symbols, control information symbols and so on) are multiplexed. In this way, according to the configuration to make the first symbol in each subframe the orthogonal multiplexing part, it is possible to prevent the decrease of the efficiency of FTN multiplexing, and reduce the impact of interference against the symbols in the orthogonal multiplexing part.

Note that the symbol location where the orthogonal multiplexing part is configured is by no means limited the first symbol, and may be any predetermined location within a subframe. Also, the orthogonal multiplexing part is preferably configured so that reference signals are multiplexed in a predetermined cycle. Still, a configuration may be employed here in which the orthogonal multiplexing part assumes different symbol locations on a per subframe basis. Also, a plurality of orthogonal multiplexing parts may be configured in a subframe. For example, symbol #1, which is the first symbol in a subframe, and symbol #14, which is the last symbol in the subframe, may be configured as orthogonal multiplexing parts. Also, symbol #7 and/or symbol #8, which are symbols located in the center of a subframe, may be configured as an orthogonal multiplexing part as well.

Figure 14:
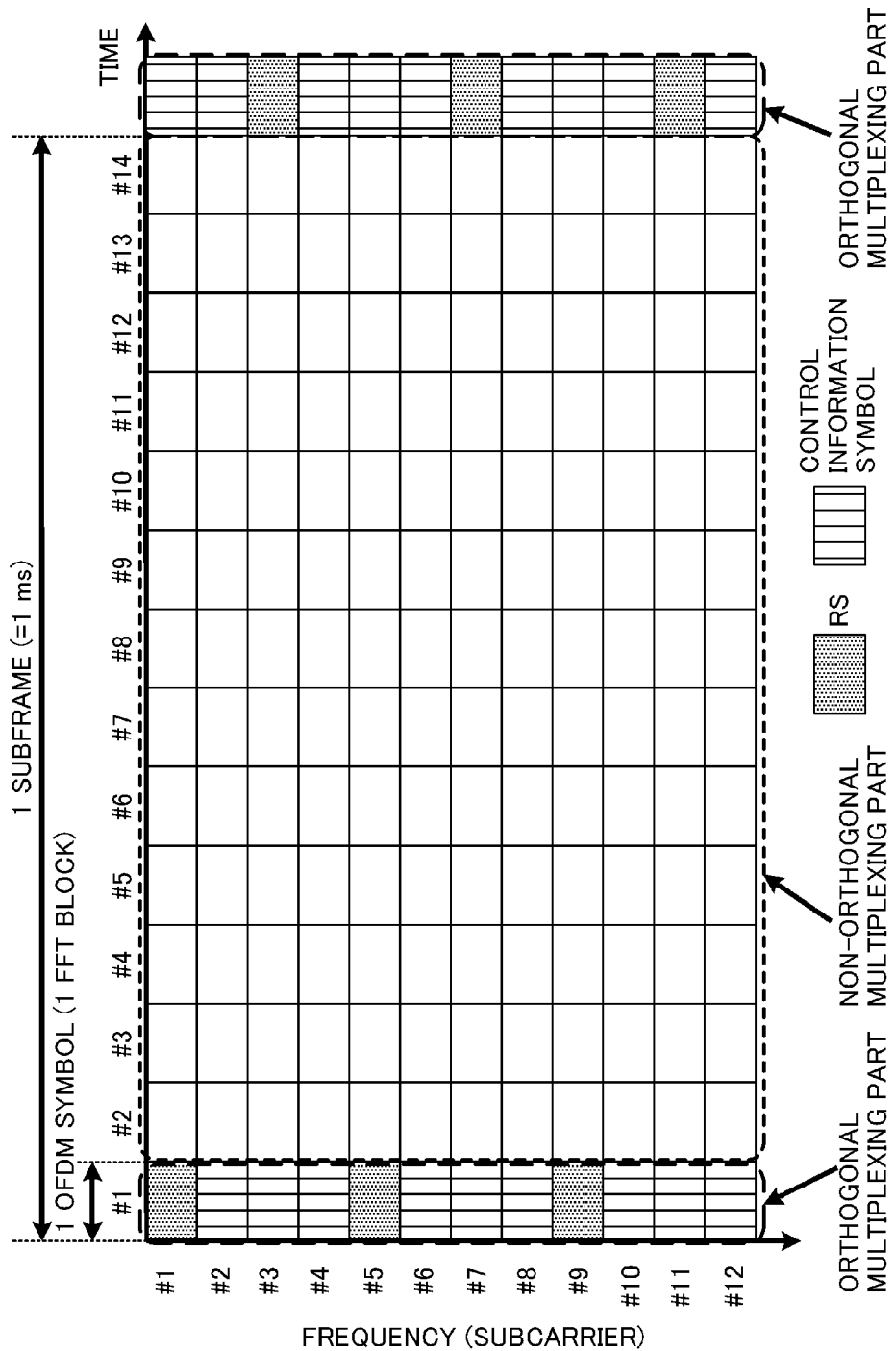
FIG. 14 is a diagram to show an example of a specific symbol arrangement in reference signal multiplexing according to the second embodiment.

Also, it is equally possible to employ a structure in which the subcarrier locations to arrange reference signal symbols in the orthogonal multiplexing part vary per subframe. FIG. 14 is a diagram to show an example of a specific symbol arrangement in reference signal multiplexing according to the second embodiment. FIG. 14 shows a configuration in which reference signal or control information symbols are allocated to the orthogonal multiplexing part allocated in symbol #1 in each subframe, and in which the subcarrier locations of reference signal symbols vary between subframes.

Also, the orthogonal multiplexing part, reference signal symbols pertaining to the same transmitting antennas may be multiplexed, or reference signal symbols to pertain to a plurality of different transmitting antennas may be multiplexed (for example, in frequency division multiplexing (FDM)). The latter configuration may be used when a plurality of transmitting antennas' RS symbols for multi-antenna transmission/reception (MIMO multiplexing) or transmit diversity are multiplexed in the orthogonal multiplexing part.

Figure 15:
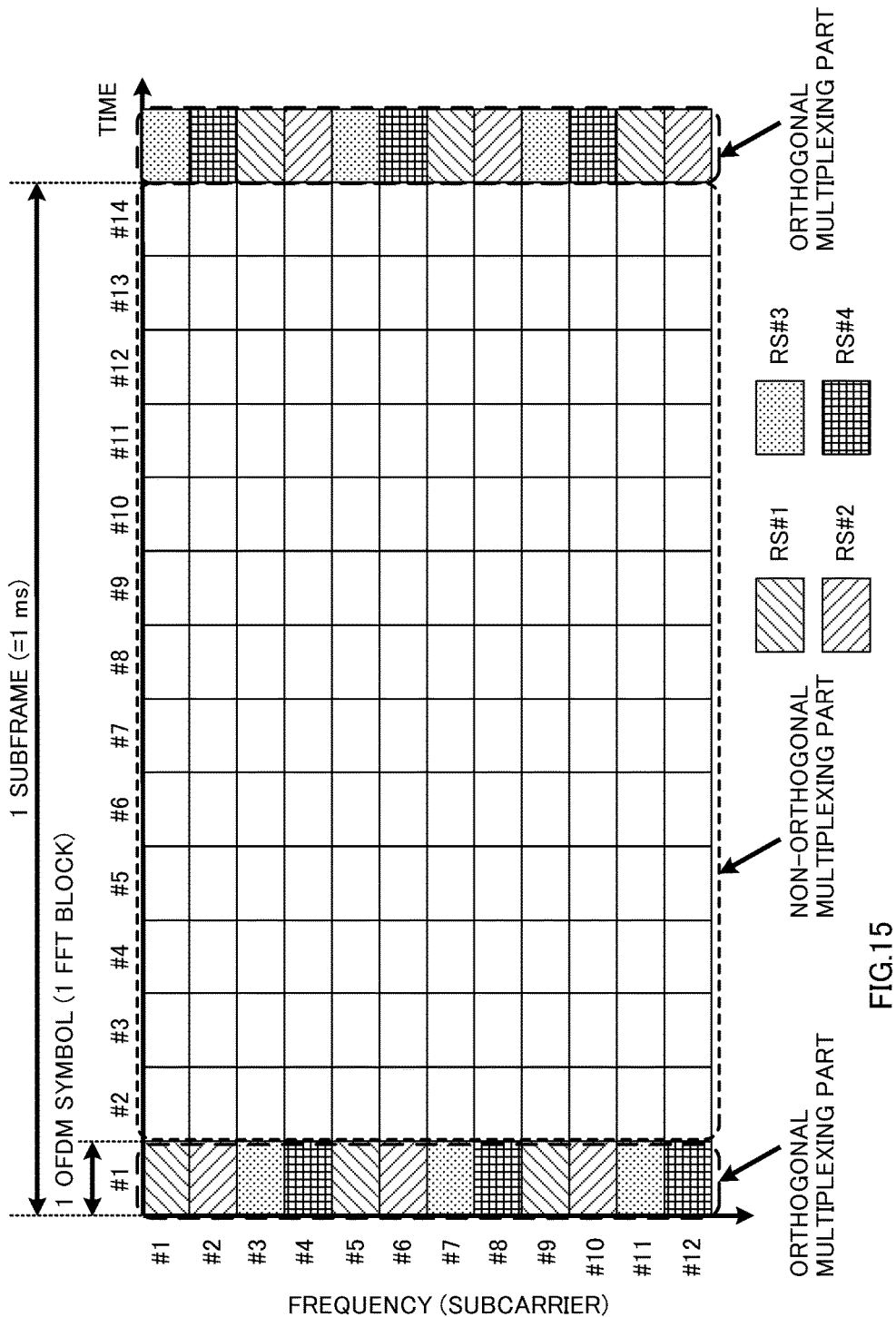
FIG. 15 is a diagram to show an example of a specific symbol arrangement in reference signal multiplexing according to the second embodiment.

FIG. 15 is a diagram to show an example of a specific symbol arrangement in reference signal multiplexing according to the second embodiment. FIG. 15 shows a configuration in which, in the orthogonal multiplexing part allocated to symbol #1, which is the first symbol in each subframe, reference signals RS #1 to RS #4, which correspond to transmitting antennas #1 to #4, respectively, are multiplexed in different subcarrier locations.

According to the second embodiment, reference signals are arranged at least in part of the orthogonal multiplexing part, and therefore channel estimation needs to be executed in other frequency and time resources. First, for the orthogonal multiplexing part, channel estimation is executed in each subcarrier location along the frequency direction. For example, the channel response (channel state) in each subcarrier location is estimated by interpolating (for example, by way of a weighted in-phase addition) the channel response in each subcarrier location in the frequency domain. As for the weight to use in interpolation, a fixed weighting coefficient, determined by a predetermined simulation, may be used, or a weighting coefficient to comply with the minimum mean squared error (MMSE) principle may be used.

When channel estimation in the orthogonal multiplexing part is complete, the channel responses in subcarrier locations in the orthogonal multiplexing part in a given subframe and the orthogonal multiplexing part in the next subframe following the given subframe are interpolated, thereby estimating the channel response in each FFT block location in the time domain. The weighting method may be the same method as that used in the frequency domain. Note that the method of channel estimation in each FTT block location is by no means limited to the above-described one.

As described above, according to the second embodiment, an orthogonal multiplexing part where reference signal symbols are multiplexed and a non-orthogonal multiplexing part where FTN symbols are arranged are subjected to TDM. By this means, it is possible to reduce the impact of ISI and ICI from FTN symbols against the radio resources where reference signals are allocated.

(Structure of Radio Communication System)

Now, a structure of a radio communication system according to an embodiment of the present invention will be described below. In this radio communication system, the radio communication methods according to the above first embodiment and the second embodiment are used.

Figure 16:
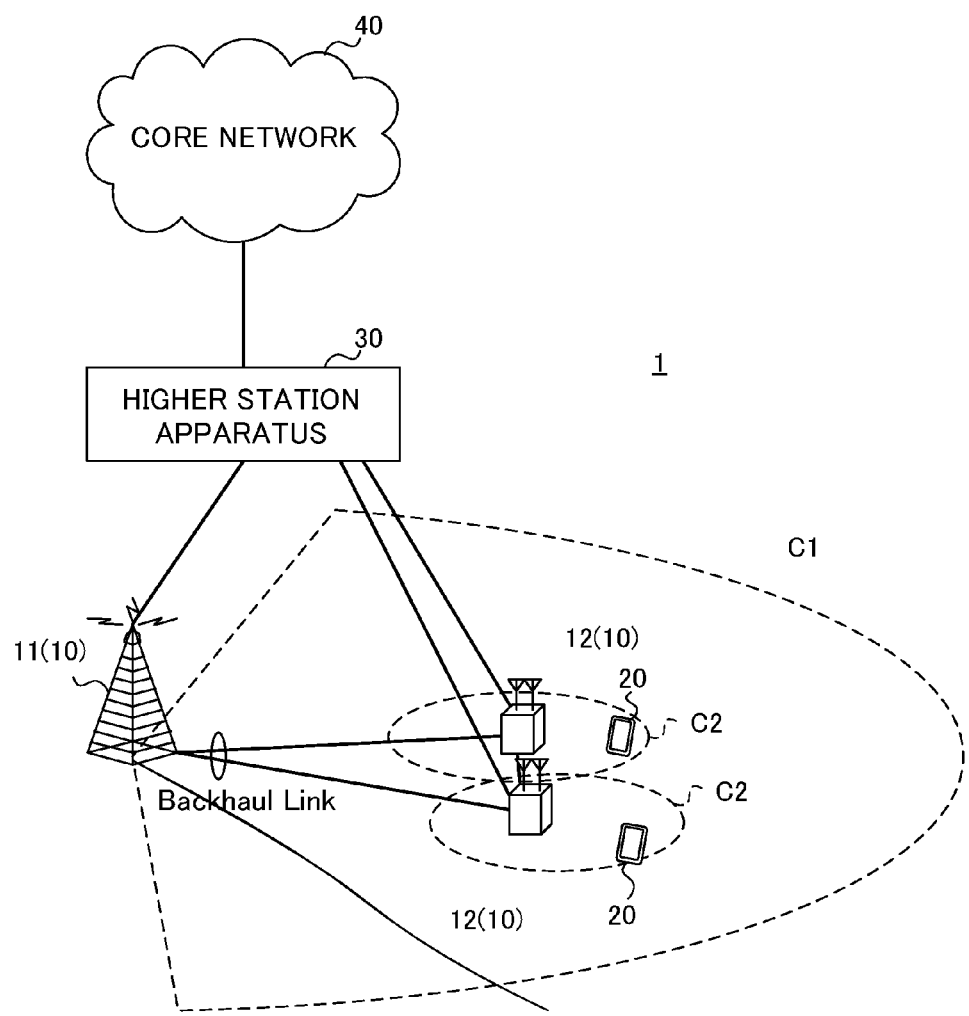
FIG. 16 is a schematic diagram to show an example of a radio communication system according to an embodiment of the present invention.

FIG. 16 is a schematic structure diagram to show an example of the radio communication system according to an embodiment of the present invention. As shown in FIG. 16, a radio communication system 1 is comprised of a plurality of radio base stations 10 (11 and 12), and a plurality of user terminals 20 that are present within cells formed by each radio base station 10, and that are configured to be capable of communicating with each radio base station 10. The radio base stations 10 are each connected with a higher station apparatus 30, and are connected to a core network 40 via the higher station apparatus 30.

In FIG. 16, the radio base station 11 is, for example, a macro base station having a relatively wide coverage, and forms a macro cell C1. The radio base stations 12 are, for example, small base stations having local coverages, and form small cells C2. Note that the number of radio base stations 11 and 12 is not limited to that illustrated in FIG. 16. Also, a structure is equally possible in which any of the radio base stations 11 and 12 is not provided.

The macro cell C1 and the small cells C2 may use the same frequency band or may use different frequency bands. Also, the macro base stations 11 and 12 are connected with each other via an inter-base station interface (for example, optical fiber, the X2 interface, etc.).

Note that the macro base station 11 may be referred to as an "eNodeB" (eNB), a "radio base station," a "transmission point," and so on. The small base stations 12 are radio base stations that have local coverages, and may be referred to as "RRHs" (Remote Radio Heads), "pico base stations," "femto base stations," "home eNodeBs," "transmission points," "eNodeBs" (eNBs), and so on.

The user terminals 20 are terminals to support various communication schemes such as LTE, LTE-A and so on, and may include both mobile communication terminals and stationary communication terminals. The user terminals 20 can communicate with other user terminals 20 via the radio base stations 10. Also, the user terminal 20 can each directly communicate (i.e. D2D: Device-to-Device) with other user terminals 20 without involving radio base stations 10. That is, the user terminals 20 may have functions for directly transmitting/receiving device-to-device signals (D2D signals) such as D2D discovery, D2D synchronization and D2D communication signals. Note that, although D2D signals use SC-FDMA (Single Carrier-Frequency Division Multiple Access) as the fundamental signal format, this is by no means limiting.

The higher station apparatus 30 may be, for example, an access gateway apparatus, a radio network controller (RNC), a mobility management entity (MME) and so on, but is by no means limited to these.

In the radio communication system 1, a downlink shared channel (PDSCH: Physical Downlink Shared Channel), which is used by each user terminal 20 on a shared basis, downlink control channels (PDCCH (Physical Downlink Control Channel), EPDCCH (Enhanced Physical Downlink Control Channel), etc.), a broadcast channel (PBCH: Physical Broadcast Channel) and so on are used as downlink channels. User data, higher layer control information and predetermined SIBs (System Information Blocks) are communicated in the PDSCH. Downlink control information (DCI) is communicated by the PDCCH and the EPDCCH. Also, synchronization signals, MIBs (Master Information Blocks) and so on are communicated by the by the PBCH.

Also, in the radio communication system 1, an uplink shared channel (PUSCH: Physical Uplink Shared Channel), which is used by each user terminal 20 on a shared basis, an uplink control channel (PUCCH: Physical Uplink Control Channel) and so on are used as uplink channels. User data and higher layer control information are communicated by the PUSCH. Also, in the radio communication system 1, D2D discovery signals for allowing the user terminals 20 to detect each other may be transmitted using uplink resources.

Figure 17:
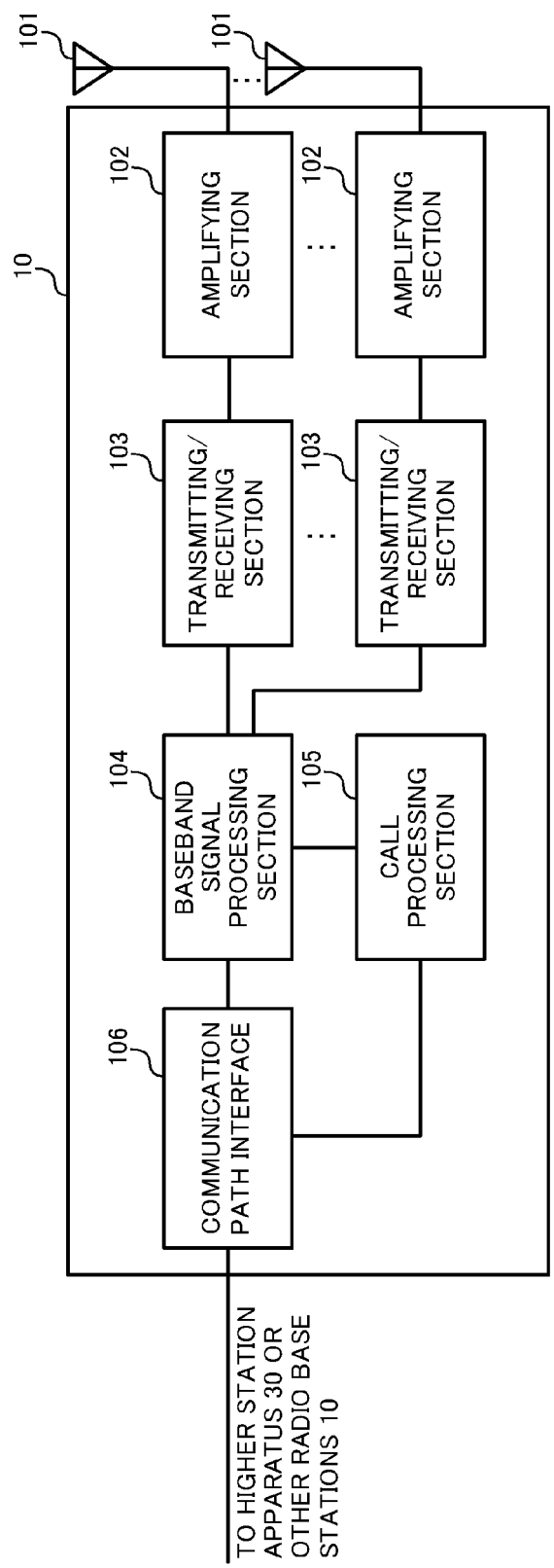
FIG. 17 is a diagram to explain an overall structure of a radio base station according to an embodiment of the present invention.

FIG. 17 is a diagram to show an overall structure of a radio base station 10 according to an embodiment of the present invention. The radio base station 10 has a plurality of transmitting/receiving antennas 101 for MIMO communication, amplifying sections 102, transmitting/receiving sections (transmitting sections) 103, a baseband signal processing section 104, a call processing section 105 and a communication path interface 106.

User data to be transmitted from the radio base station 10 to a user terminal 20 on the downlink is input from the higher station apparatus 30 to the baseband signal processing section 104, via the communication path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control (including, for example, an HARQ (Hybrid ARQ) transmission process), scheduling, transport format selection, channel coding, an inverse fast Fourier transform (IFFT) process and a precoding process are performed, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts downlink signals, pre-coded and output from the baseband signal processing section 104 on a per antenna basis, into a radio frequency band. Also, the transmitting/receiving sections 103 constitute the transmission section of the present embodiment. The amplifying sections 102 amplify the radio frequency signals having been subjected to frequency conversion, and transmit the signals through the transmitting/receiving antennas 101.

On the other hand, as for uplink signals, radio frequency signals that are received in the transmitting/receiving antennas 101 are each amplified in the amplifying sections 102, converted into the baseband signal through frequency conversion in each transmitting/receiving section 103, and input into the baseband signal processing section 104.

In the baseband signal processing section 104, user data that is included in the baseband signals that are input is subjected to an inverse fast Fourier transform (IFFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, the X2 interface, etc.). Alternatively, the communication path interface 106 transmits and receives signals to and from the higher station apparatus 30 via a predetermined interface.

Figure 18:
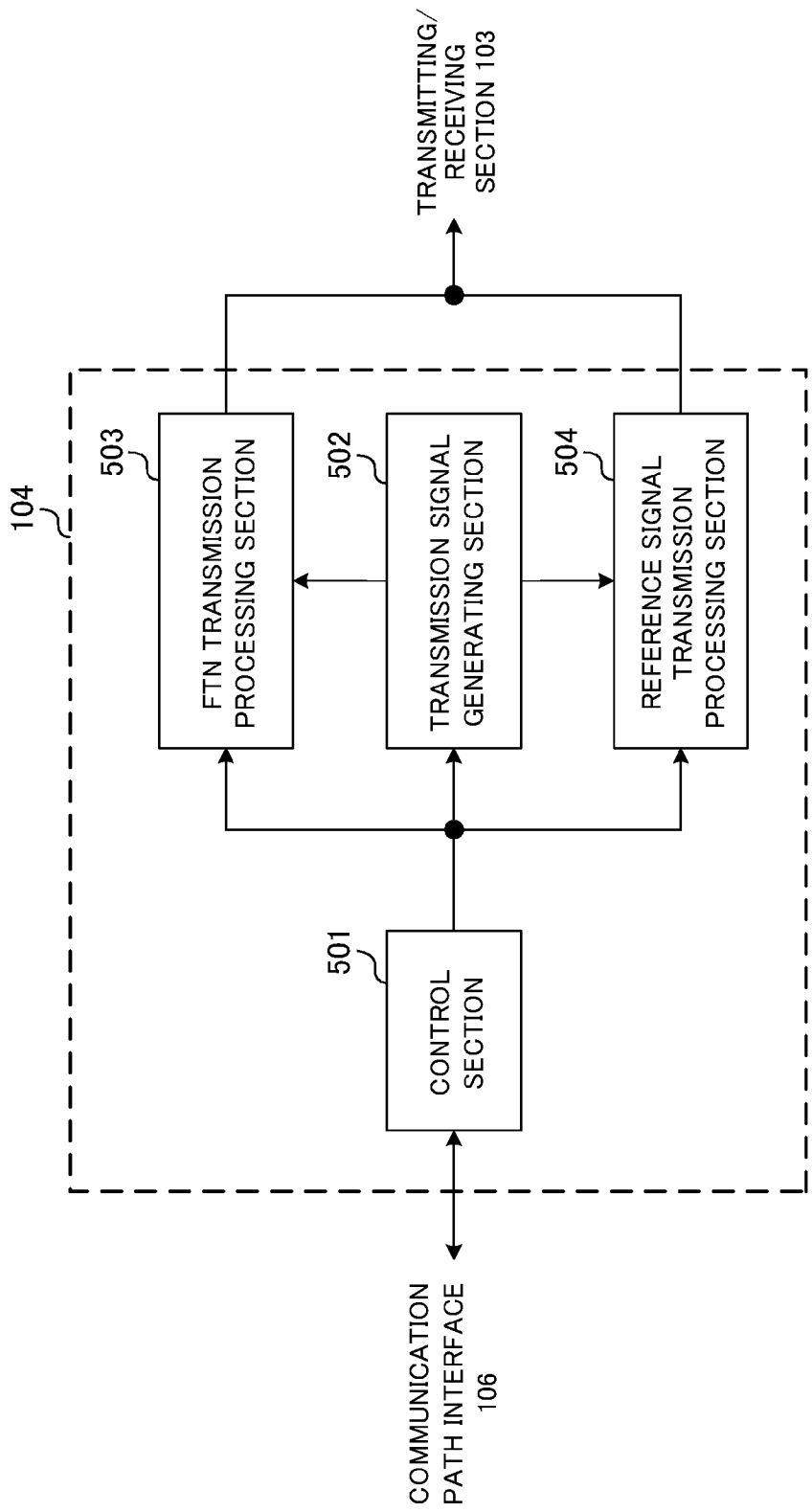
FIG. 18 is a diagram to explain a functional structure of a radio base station according to an embodiment of the present invention.

FIG. 18 is a diagram to show a principle functional structure of the baseband signal processing section 104 provided in the radio base station 10 according to an embodiment of the present invention. As shown in FIG. 18, the baseband signal processing section 104 provided in the radio base station 10 is comprised at least of a control section 501, a transmission signal generating section 502, an FTN transmission processing section (transmission processing section) 503 and a reference signal transmission processing section 504.

The control section 501 controls the scheduling of downlink user data that is transmitted in the PDSCH, downlink control information that is communicated in one or both of the PDCCH and the enhanced PDCCH (EPDCCH), downlink reference signals and so on. Also, the control section 501 also controls the scheduling of RA preambles transmitted from user terminals 20 in the PRACH, uplink data that is communicated in the PUSCH, uplink control information that is communicated in the PUCCH or the PUSCH, and uplink reference signals. Information about the scheduling (allocation control) of downlink signals and uplink signals is reported to user terminals 20 by using downlink control signals (DCI).

The control section 501 controls the allocation of radio resources to downlink signals and uplink signals based on command information from the higher station apparatus 30, acquired via the communication path interface 106, feedback information (for example, CSI) transmitted from each user terminal 20, acquired via the transmitting/receiving sections 103. That is, the control section 501 functions as a scheduler. Note that, when a separate radio base station 10 or the higher station apparatus 30 functions as a supervisory scheduler for a plurality of the radio base stations 10, the control section 501 may not be provided with scheduler functions.

The control section 501 controls the transmission signal generating section 502, the FTN transmission processing section 503 and the reference signal transmission processing section 504 so that transmission signals are time-division-multiplexed (TDM) over a first radio resource region (orthogonal multiplexing part) where OFDM/OQAM multiplex symbols are multiplexed and a second radio resource region (non-orthogonal multiplexing part) where FTN symbols are arranged (second embodiment). The control section 501 preferably executes control so that signals to be communicated with high quality are mapped to the orthogonal multiplexing part. For example, the control section 501 may preferably execute control so that reference signal symbols are multiplexed in the orthogonal multiplexing part.

The transmission signal generating section 502 may generate the downlink control signals and downlink data signals determined to be allocated in the control section 501, and outputs these to the FTN transmission processing section 503 and the reference signal transmission processing section 504. For example, the downlink control signal generating section 502 generates a DL assignment, which reports downlink signal allocation information, and a UL grant, which reports uplink signal allocation information, based on commands from the control section 301.

Also, the transmission signal generating section 502 may generate information about the resources that are allocated in time-division-multiplexing, based on commands from the control section 501, as downlink control information (DCI) to transmit in downlink control channels (PDCCH, EPDCCH) or as information to report in higher layer signaling (for example, RRC signaling, broadcast signals, etc.). The transmission signal generating section 502 may generate, for example, symbol locations in the orthogonal multiplexing part, subcarrier locations where reference signals are multiplexed in the orthogonal multiplexing part, and subcarrier locations corresponding respectively to a plurality of antennas (or antenna ports) in the orthogonal multiplexing part, as the information about the resources to allocate in time division multiplexing.

The FTN transmission processing section 503 applies FTN to the information symbols output from the transmission signal generating section 502, based on information about the non-orthogonal multiplexing part, which is reported from the control section 501, and maps a transmission signal (FTN signal), in which the information symbols are multiplexed at a faster rate than the Nyquist rate, in the non-orthogonal multiplexing part, and outputs this signal.

Note that the FTN transmission processing section 503 has only to be configured to be able to generate and output FTN signals, and the FTN transmission processing section 300, which has been described with the first embodiment, may be used. Also, the FTN transmission processing section 503 may be configured to be capable of outputting normal OFDM signals (OFDM/OQAM signals) without applying FTN.

The reference signal transmission processing section 504 maps the reference signals output from the transmission signal generating section 502 in the orthogonal multiplexing part, based on information about the orthogonal multiplexing part, which is reported from the control section 501, and outputs a normal OFDM signal (OFDM/OQAM signal).

The FTN signals and reference signals output from the FTN transmission processing section 503 and the reference signal transmission processing section 504 are transmitted to the user terminals 20 via the transmitting/receiving section 103.

Note that the FTN transmission processing section 503 is configured to be capable of switching the output between FTN signals and normal OFDM signals (OFDM/OQAM signals), the FTN transmission processing section 503 may then be configured to map the reference signals output from the transmission signal generating section 502, to the orthogonal multiplexing part, based on information about the orthogonal multiplexing part, which is reported from the control section 501. In this case, a structure to remove the reference signal transmission processing section 504 may be employed.

Also, the FTN transmission processing section 503 may be configured to map the data signals, control signals and so on, output from the transmission signal generating section 502, in the orthogonal multiplexing part, as information symbols (data symbols, control information symbols, etc.).

Figure 19:
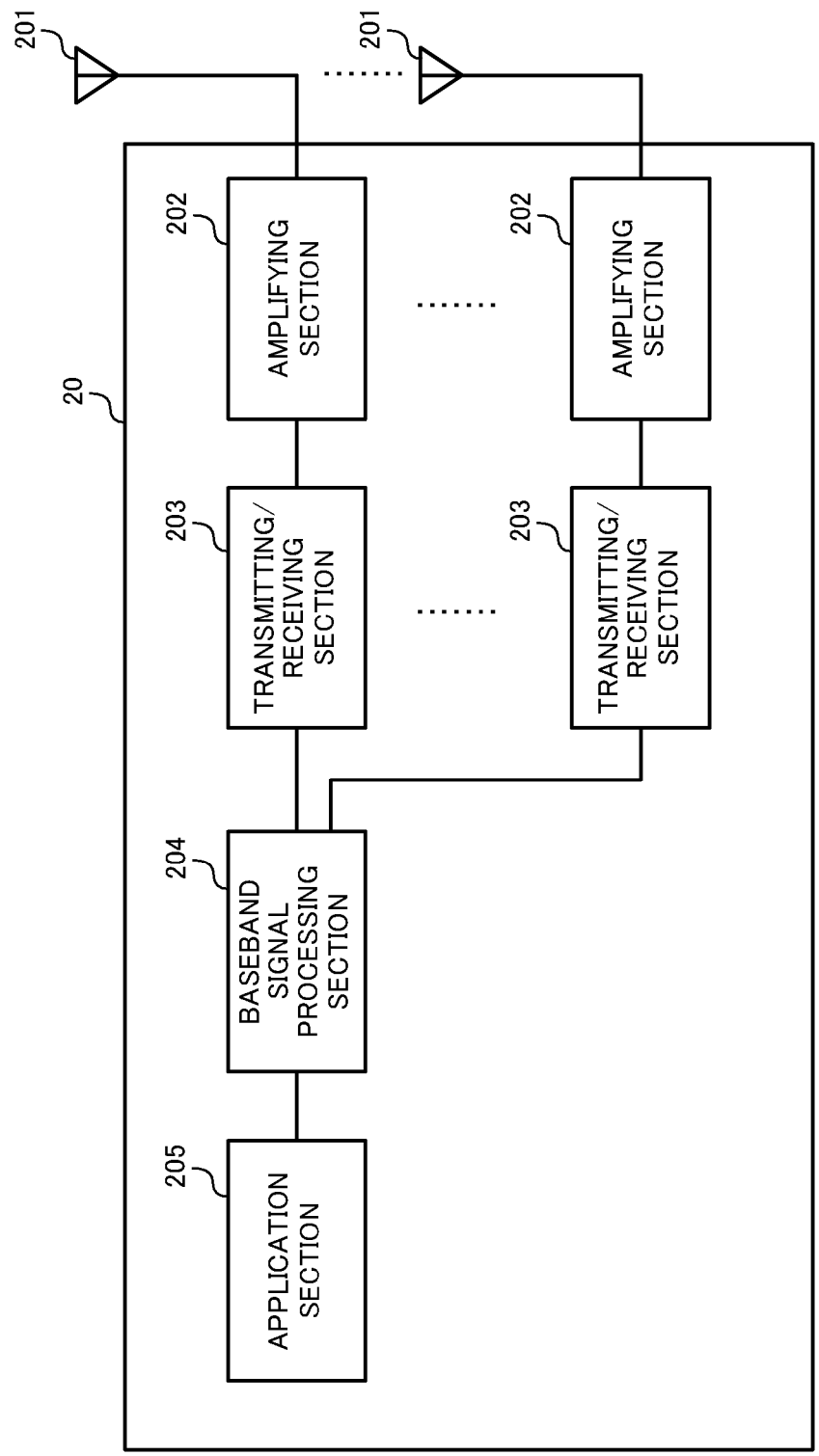
FIG. 19 is a diagram to explain an overall structure of a user terminal according to an embodiment of the present invention.

FIG. 19 is a diagram to show an overall structure of a user terminal 20 according to an embodiment of the present invention. As shown in FIG. 19, the user terminal 20 has a plurality of transmitting/receiving antennas 201 for MIMO communication, amplifying sections 202, transmitting/receiving sections (receiving sections) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into the baseband signal in the transmitting/receiving sections 203. This baseband signal is subjected to an FFT process, error correction decoding, a retransmission control receiving process and so on in the baseband signal processing section 204. In this downlink data, downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203. After that, the amplifying sections 202 amplify the radio frequency signal having been subjected to frequency conversion, and transmit the resulting signal from the transmitting/receiving antennas 201.

Figure 20:
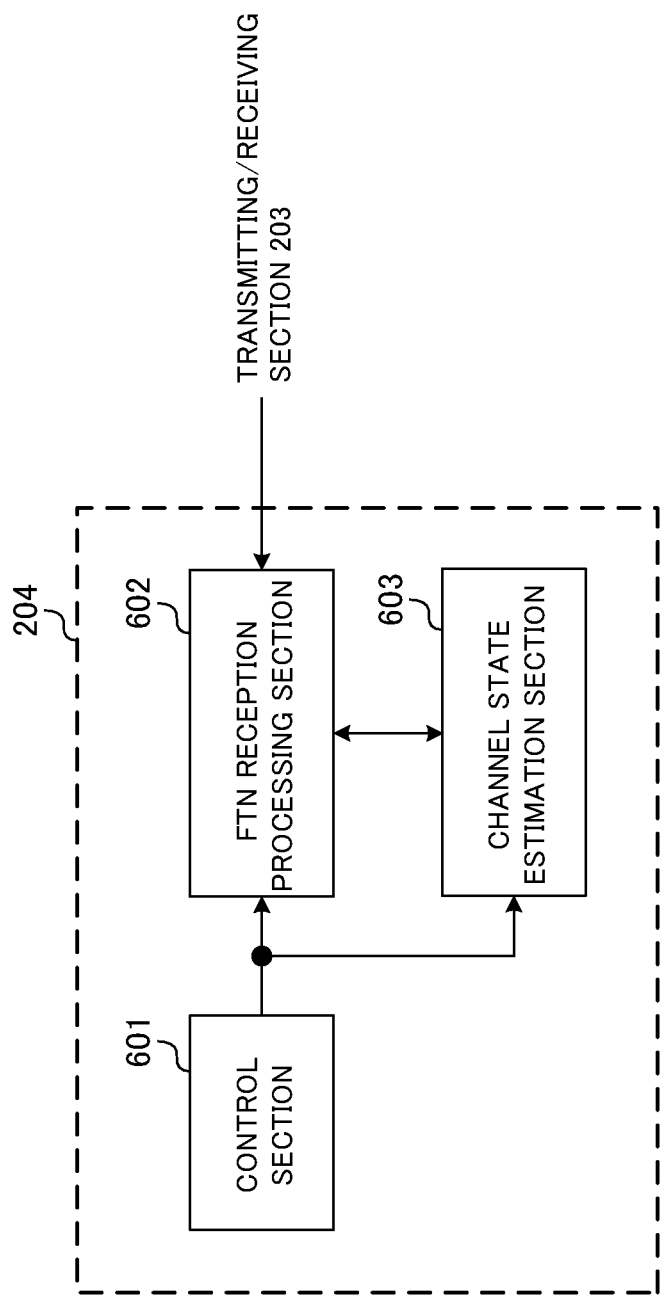
FIG. 20 is a diagram to explain a functional structure of a user terminal according to an embodiment of the present invention.

FIG. 20 is a diagram to show a principle functional structure of the baseband signal processing section 204 provided in the user terminal 20 according to an embodiment of the present invention. As shown in FIG. 20, the baseband signal processing section 204 provided in the user terminal 20 is comprised at least of a control section 601, an FTN reception reception processing section (reception reception processing section) 602 and a channel state estimation section 603.

The control section 601 acquires information about the resources which the radio base stations allocate in time division multiplexing, from downlink control signals (DCI) or higher layer signaling (for example, RRC signaling, broadcast signals and so on) transmitted from the radio base station 10. However, the method of acquiring information about the resources to allocate in time division multiplexing is by no means limited to this, and a configuration may be employed here in which the information is held in the user terminal 20 in advance or reported from other user terminals 20.

Also, the control section 601 identifies (recognizes) the orthogonal multiplexing part and the non-orthogonal multiplexing part based on the information about the resources allocated in time division multiplexing. To be more specific, the control section 601 identifies the symbol locations, subcarrier locations and so on in the orthogonal multiplexing part and the non-orthogonal multiplexing part, and controls the FTN reception processing section 602 as to whether or not to perform receiving processes (demapping, interference cancellation and so on) of received signals as FTN signals (second embodiment). For example, a configuration may be employed here in which a signal that corresponds to the orthogonal multiplexing part is subjected to receiving processes as an OFDM signal (OFDM/OQAM signal), not as an FTN signal.

In accordance with the control by the control section 601, the FTN reception processing section 602 performs receiving processes of the signals allocated to the orthogonal multiplexing part as FTN signals, among the received signals that are received as input from the transmitting/receiving sections 203, and performs receiving processes of the signals allocated to the non-orthogonal multiplexing part as normal OFDM signals (OFDM/OQAM signals).

Note that the FTN reception processing section 602 has only to be configured to be capable of acquiring information symbols by applying receiving processes to FTN signals, and the FTN reception processing section 400, which has been described with the first embodiment, may be used. Also, the FTN reception processing section 602 may be configured to be capable of decoding normal OFDM signals (OFDM/OQAM signals) without applying FTN.

Also, as for the reference signals arranged in the non-orthogonal multiplexing part, the FTN reception processing section 602 outputs the signals after multi-carrier demodulation (FFT) to the channel state estimation section 603.

The channel state estimation section 603 estimates channel states (channel response) based on the reference signals input from the FTN reception processing section 602. Note that, when information about the reference signal multiplexing location per transmitting antenna, pertaining to a plurality of transmitting antennas, is acquired from the control section 601, each antenna's channel state can be estimated based on this information.

Also, based on the results of channel estimation executed based on the reference signals, the channel state estimation section 603 executes channel estimation for radio resources apart from the radio resources where reference signals are allocated. For example, after having performed channel estimation in each subcarrier location along the frequency direction with respect to the orthogonal multiplexing part, the channel state estimation section 603 can perform channel estimation in each subcarrier and each symbol location along the time direction with respect to the non-orthogonal multiplexing part.

To be more specific, the channel state estimation section 603, for example, interpolates the channel response in each subcarrier location in the frequency domain (for example, by way of weighted in-phase addition), and estimates the channel response of each subcarrier location. Then, the channel state estimation section 603 interpolates the channel response of each subcarrier location in the orthogonal multiplexing part in a given subframe and in the orthogonal multiplexing part in the next subframe following the given subframe, and estimates the channel state pertaining to each symbol location in the time domain.

The channel state estimation section 603 outputs the channel estimation results to the FTN reception processing section 602. The channel estimation results may be, for example, used in the FTN symbol demapping process in the FTN demapping section 403 according to the first embodiment, by using equation 12.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2014-039562, filed on Feb. 28, 2014, including the specification, drawings and abstract, is incorporated herein by reference in its entirety.

The invention claimed is:

1. A radio base station comprising:
   a processor that executes control so that signals are time-division-multiplexed over a first radio resource region where symbols are multiplexed at a rate equal to or below a Nyquist rate and a second radio resource region where symbols are multiplexed at a faster rate than the Nyquist rate; and
   a transmitter that transmits the signals that are time-division-multiplexed in the first radio resource region and the second radio resource region, to a user terminal,
   wherein channel states are estimated based on reference signal symbols multiplexed in the first radio resource region, wherein a channel response is estimated in each subcarrier location in the first radio resource region based on channel responses in a plurality of subcarrier locations where the reference signal symbols are allocated, and wherein the channel response is estimated in each subcarrier location and each symbol location in the second radio resource region based on the channel response in each subcarrier location in the first radio resource region in a given subframe and the first radio resource region in a next subframe following the given subframe.

2. The radio base station according to claim 1, wherein the processor controls a first symbol in each subframe as the first radio resource region.

3. The radio base station according to claim 1, wherein the processor executes control so that the reference signal symbols are allocated to the first radio resource region.

4. The radio base station according to claim 3, wherein the processor executes control so that control information symbols are allocated to part of the first radio resource region.

5. The radio base station according to claim 3, further comprising a plurality of transmitting antennas, wherein the processor executes control so that the reference signal symbols corresponding to each transmitting antenna are frequency-division-multiplexed and allocated to the first radio resource region.

6. A user terminal comprising:

a receiver that receives signals that are time-division-multiplexed over a first radio resource region where symbols are multiplexed at a rate equal to or below a Nyquist rate and a second radio resource region where symbols are multiplexed at a faster rate than the Nyquist rate; and a processor that estimates channel states based on reference signal symbols multiplexed in the first radio resource region, wherein the processor estimates a channel response in each subcarrier location in the first radio resource region based on channel responses in a plurality of subcarrier locations where the reference signal symbols are allocated, and wherein the processor estimates a channel response in each subcarrier location and each symbol location in the second radio resource region based on the channel response in each subcarrier location in the first radio resource region in a given subframe and the first radio resource region in a next subframe following the given subframe.

7. A radio communication method in a radio base station that communicates with a user terminal, the radio communication method comprising the steps of:

executing control so that signals are time-division-multiplexed over a first radio resource region where symbols are multiplexed at a rate equal to or below a Nyquist rate and a second radio resource region where symbols are multiplexed at a faster rate than the Nyquist rate;

transmitting, by the radio base station, the signals that are time-division-multiplexed in the first radio resource region and the second radio resource region, to the user terminal;

receiving, by the user terminal, the signals that are time-division-multiplexed over the first radio resource region and the second radio resource region;

estimating, by the user terminal, channel states based on reference signal symbols multiplexed in the first radio resource region;

estimating, by the user terminal, a channel response in each subcarrier location in the first radio resource region based on channel responses in a plurality of subcarrier locations where the reference signal symbols are allocated; and estimating, by the user terminal, a channel response in each subcarrier location and each symbol location in the second radio resource region based on the channel response in each subcarrier location in the first radio resource region in a given subframe and the first radio resource region in a next subframe following the given subframe.

8. The radio base station according to claim 2, wherein the processor executes control so that the reference signal symbols are allocated to the first radio resource region.

9. The radio base station according to claim 8, wherein the processor executes control so that control information symbols are allocated to part of the first radio resource region.

10. The radio base station according to claim 8, further comprising a plurality of transmitting antennas, wherein the processor executes control so that the reference signal symbols corresponding to each transmitting antenna are frequency-division-multiplexed and allocated to the first radio resource region.

* * * * *